(12) United States Patent
Hunter et al.

(10) Patent No.: US 9,567,108 B2
(45) Date of Patent: Feb. 14, 2017

(54) GAS GUN LAUNCHER

(71) Applicant: QUICKLAUNCH, INC., Carmel, CA (US)

(72) Inventors: John William Hunter, Escondido, CA (US); Harry E. Cartland, Carmel, CA (US); Philip James Sluder, El Cajon, CA (US); Richard Edward Twogood, Dublin, CA (US)

(73) Assignee: QUICKLAUNCH, INC., Carmel, CA (US)

( * ) Notice: Subject to any disclaimer, the term of this patent is extended or adjusted under 35 U.S.C. 154(b) by 284 days.

(21) Appl. No.: 14/659,572

(22) Filed: Mar. 16, 2015

(65) Prior Publication Data

US 2015/0307213 A1 Oct. 29, 2015

Related U.S. Application Data

(63) Continuation of application No. 13/430,671, filed on Mar. 26, 2012, now Pat. No. 8,979,033, which is a continuation of application No. PCT/US2010/050437, filed on Sep. 27, 2010.

(60) Provisional application No. 61/277,543, filed on Sep. 25, 2009, provisional application No. 61/277,544, filed on Sep. 25, 2009.

(51) Int. Cl.
| | |
|---|---|
| *B64G 1/00* | (2006.01) |
| *F41F 3/04* | (2006.01) |
| *F41A 1/02* | (2006.01) |
| *F41B 11/68* | (2013.01) |

(Continued)

(52) U.S. Cl.
CPC ............... *B64G 1/002* (2013.01); *F41A 1/02* (2013.01); *F41B 11/68* (2013.01); *F41F 1/00* (2013.01); *F42B 15/01* (2013.01)

(58) Field of Classification Search
CPC .............. B64G 1/002; B64G 5/00; F41F 1/00; F41F 3/00; F41F 3/04; F41B 11/68; F41B 11/681; F41B 11/682; F41A 1/08
See application file for complete search history.

(56) References Cited

U.S. PATENT DOCUMENTS

| | | | |
|---|---|---|---|
| 2,380,317 | A | 7/1945 | Kline et al. |
| 2,993,412 | A | 7/1961 | Goldsmith |

(Continued)

FOREIGN PATENT DOCUMENTS

| | | |
|---|---|---|
| WO | WO/2011/038365 A1 | 3/2011 |
| WO | WO/2011/038369 A1 | 3/2011 |

OTHER PUBLICATIONS

PCT/US2010/50437 International Search Report and Written Opinion dated Dec. 10, 2010.

(Continued)

*Primary Examiner* — Brian M O'Hara
(74) *Attorney, Agent, or Firm* — Strategic Innovation IP Law Offices, P.C.

(57) ABSTRACT

A gas gun launcher has a pump tube and a launch tube with a first end of the launch tube slidably inserted into a second end of the pump tube. The pump tube may hold a heat exchanger to heat a light gas used to launch a vehicle. A sliding seal can be employed to manage recoil and to retain the gas within the launch tube and the pump tube. A fast-closing muffler at the second end of the launch tube can conserve the light gas utilized for launching a vehicle, enabling the light gas to be recycled. A launch tube alignment system is preferably automatic, ensuring the survival of the launch vehicle.

18 Claims, 18 Drawing Sheets

(51) Int. Cl.
  *F41F 1/00*   (2006.01)
  *F42B 15/01*  (2006.01)

(56) References Cited

U.S. PATENT DOCUMENTS

| | | | |
|---|---|---|---|
| 3,131,597 | A | 5/1964 | Gram, Jr. et al. |
| 3,245,318 | A | 4/1966 | Finkelstein et al. |
| 3,384,323 | A | 5/1968 | Gilbert et al. |
| 3,427,648 | A | 2/1969 | Manning et al. |
| 3,453,960 | A | 7/1969 | Qualls |
| 3,597,969 | A | 8/1971 | Curchack |
| 3,665,861 | A | 5/1972 | Jaslow |
| 3,706,281 | A | 12/1972 | Hatakeyama |
| 3,714,900 | A | 2/1973 | Feldmann |
| 3,738,279 | A | 6/1973 | Eyre et al. |
| 3,750,578 | A | 8/1973 | Blajda |
| 3,759,184 | A | 9/1973 | Blajda et al. |
| 3,769,912 | A | 11/1973 | Friend |
| 3,771,458 | A | 11/1973 | Schweimier et al. |
| 3,780,658 | A | 12/1973 | de Longueville et al. |
| 3,802,345 | A | 4/1974 | La Costa |
| 3,834,314 | A | 9/1974 | Young |
| 3,905,299 | A | 9/1975 | Feldmann |
| 4,038,903 | A | 8/1977 | Wohlford |
| 4,049,367 | A | 9/1977 | Tominaga et al. |
| 4,181,152 | A | 1/1980 | Nicoloff |
| 4,284,008 | A | 8/1981 | Kirkendall et al. |
| 4,314,510 | A | 2/1982 | Jeter et al. |
| 4,434,718 | A | 3/1984 | Kopsch et al. |
| 4,669,212 | A | 6/1987 | Jackson et al. |
| 4,702,027 | A | 10/1987 | Stanley |
| 4,709,638 | A | 12/1987 | Broden et al. |
| 4,800,816 | A | 1/1989 | Meyer |
| 4,886,223 | A | 12/1989 | Gartner |
| 4,982,669 | A | 1/1991 | Bisping et al. |
| 5,012,744 | A | 5/1991 | Sowash |
| 5,165,041 | A | 11/1992 | Bjerke et al. |
| 5,167,386 | A | 12/1992 | Laquer et al. |
| 5,404,816 | A | 4/1995 | Burri |
| 5,481,980 | A | 1/1996 | Engel et al. |
| 5,666,897 | A | 9/1997 | Armstrong |
| 5,966,858 | A | 10/1999 | Curtis et al. |
| 6,086,020 | A | 7/2000 | Machiussi |
| 6,116,136 | A | 9/2000 | Kirschner et al. |
| 6,234,082 | B1 | 5/2001 | Cros et al. |
| 6,257,527 | B1 | 7/2001 | Redding, Jr. |
| 6,298,786 | B1 | 10/2001 | Grosskrueger et al. |
| 6,494,406 | B1 | 12/2002 | Fukushima et al. |
| 6,530,543 | B2 | 3/2003 | Redding, Jr. |
| 6,536,350 | B2 | 3/2003 | Cartland et al. |
| 6,685,141 | B2 | 2/2004 | Penn |
| 7,526,988 | B2 | 5/2009 | Elder |
| 7,775,148 | B1 | 8/2010 | McDermott |
| 8,519,312 | B1 | 8/2013 | Merems |
| 8,536,502 | B2 | 9/2013 | Hunter et al. |
| 8,979,033 | B2 | 3/2015 | Hunter et al. |
| 2008/0257192 | A1 | 10/2008 | Schaeffer |
| 2009/0211225 | A1 | 8/2009 | Nyberg et al. |
| 2010/0212481 | A1 | 8/2010 | Koth |
| 2012/0187249 | A1 | 7/2012 | Hunter et al. |
| 2013/0319212 | A1 | 12/2013 | Hunter |
| 2015/0175278 | A1 | 6/2015 | Hunter et al. |

OTHER PUBLICATIONS

PCT/US2010/050441 International Search Report and Written Opinion dated Nov. 26, 2010.
PCT/US2010/50437 International Preliminary Report on Patentability dated Mar. 27, 2012.
PCT/US2010/050441 International Preliminary Report on Patentability dated Mar. 27, 2012.
Elahi, Amina; Ready, Aim, Resupply; Popular Science; Feb. 2010; 2 pp.
Gilreath, H., et al.; The Feasibility of Launching Small Satellites with a Light Gas Gun; 12th AIAA/USU Conference (Aug. 31, 1998) on Small Sateliites SSC98-III-6; pp. 1-20.
Gilreath, Harold E., et al., Gun-Launched Satellites; John Hopkins APL Technical Digest; Jul.-Sep. 1999, 17 pp.; vol. 20, No. 3; 1999 by the John Hopkins University Applied Physics Laboratory.
Gourley, Scott R.; Sharp Gun Promises to Deliver as Launcher, Jane's Defense Weekly; The Global Defense Weekly; Jun. 19, 1996: pp. 91-92.
Gourley, Scott R.; The Jules Verne Gun; Popular Mechanics; Dec. 1996: 5 pp.
Henderson, Breck W.; Livermore Proposes Light Gas Gun for Launch of Small Payloads: Aviation Week & Space Technology: Jul. 23, 1990; pp. 78-79.
May, Michael M.; The SHARP Gas Gun: Shooting Payloads into Space Jules Verne's Way; Energy Technology Review (E&TR), University of California, Lawrence Livermore National Laboratory; Jul. 1993; 13 pp.
Scott, William B., SHARP Gun Accelerates Scramjets to Mar. 9; Aviation Week & Space Technology; Sep. 9, 1996, 3 pp; A Publication of the McGraw-Hill Companies.
Wolkomir, Richard; Shooting Right for the Stars With one Gargantuan Gas Gun; Smithsonian; Jan. 1998; 9 pp.
Roger R. Bate, Donald D. Mueller, and Jerry E. White, "Fundamentals of Astrodynamics," Dover Publications, New York, 1971, pp. 162-169. (ISBN 0-486-60061-0).
U.S. Appl. No. 13/430,678 Office Action dated Jul. 2, 2012.
U.S. Appl. No. 13/430,678 Amendment dated Oct. 2, 2012.
U.S. Appl. No. 13/430,678 Office Action dated Dec. 3, 2012.
U.S. Appl. No. 13/430,678 Amendment dated Feb. 28, 2013.
U.S. Appl. No. 13/430,678 Office Action dated May 8, 2013.
U.S. Appl. No. 13/430,678 Amendment dated Jun. 20, 2013.
U.S. Appl. No. 13/430,678 Notice Allowance dated Jun. 28, 2013.
U.S. Appl. No. 13/430,678 Interview Summary dated Jul. 1, 2013.
U.S. Appl. No. 13/430,678 Amendment after Allowance dated Aug. 9, 2013.
U.S. Appl. No. 13/430,678 Office Action (Response to Rule 312 Communication) dated Aug. 20, 2013.
U.S. Appl. No. 13/963,893 Notice Allowance dated Nov. 18, 2013.

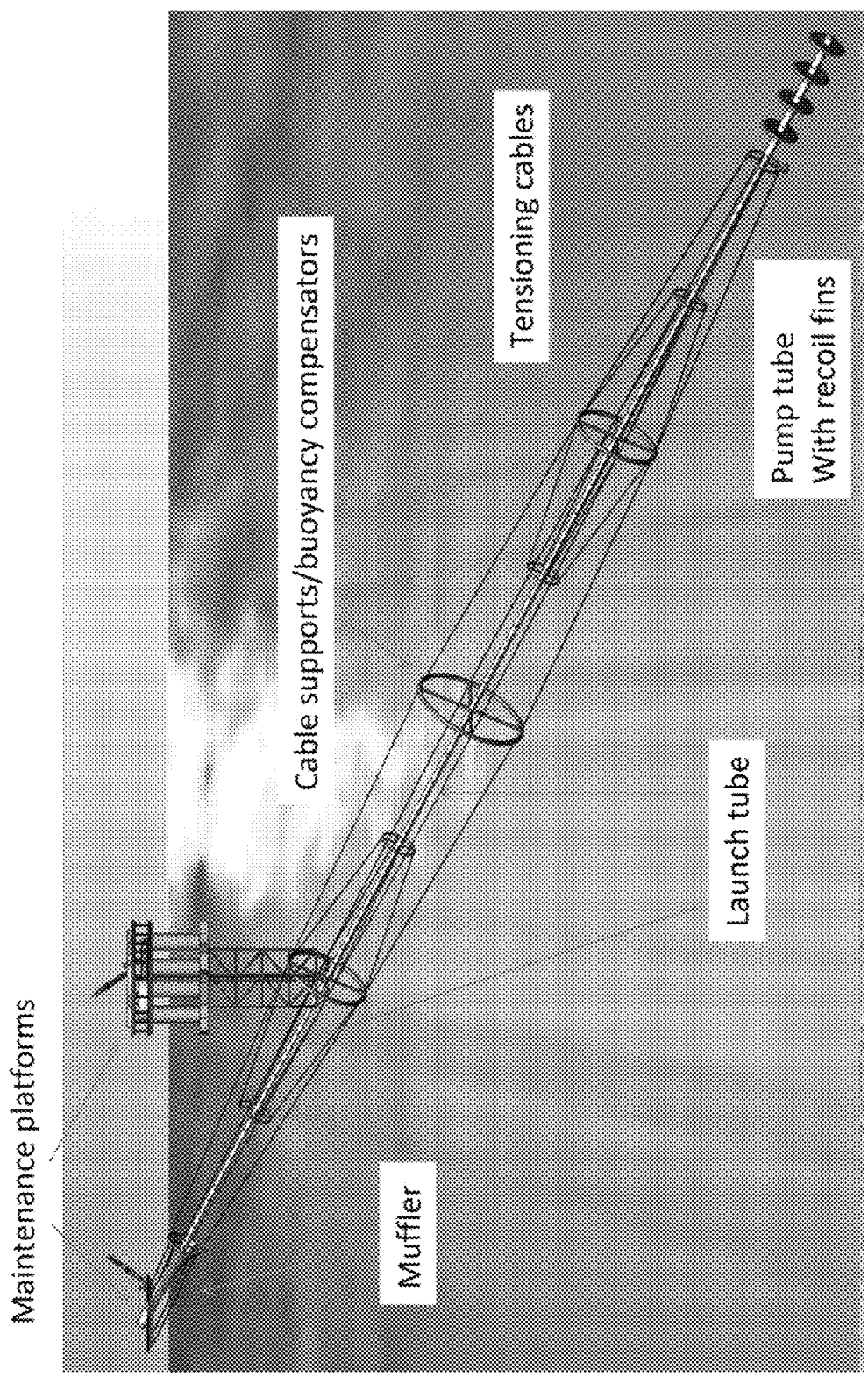
Figure 1. Ocean Based Quicklauncher

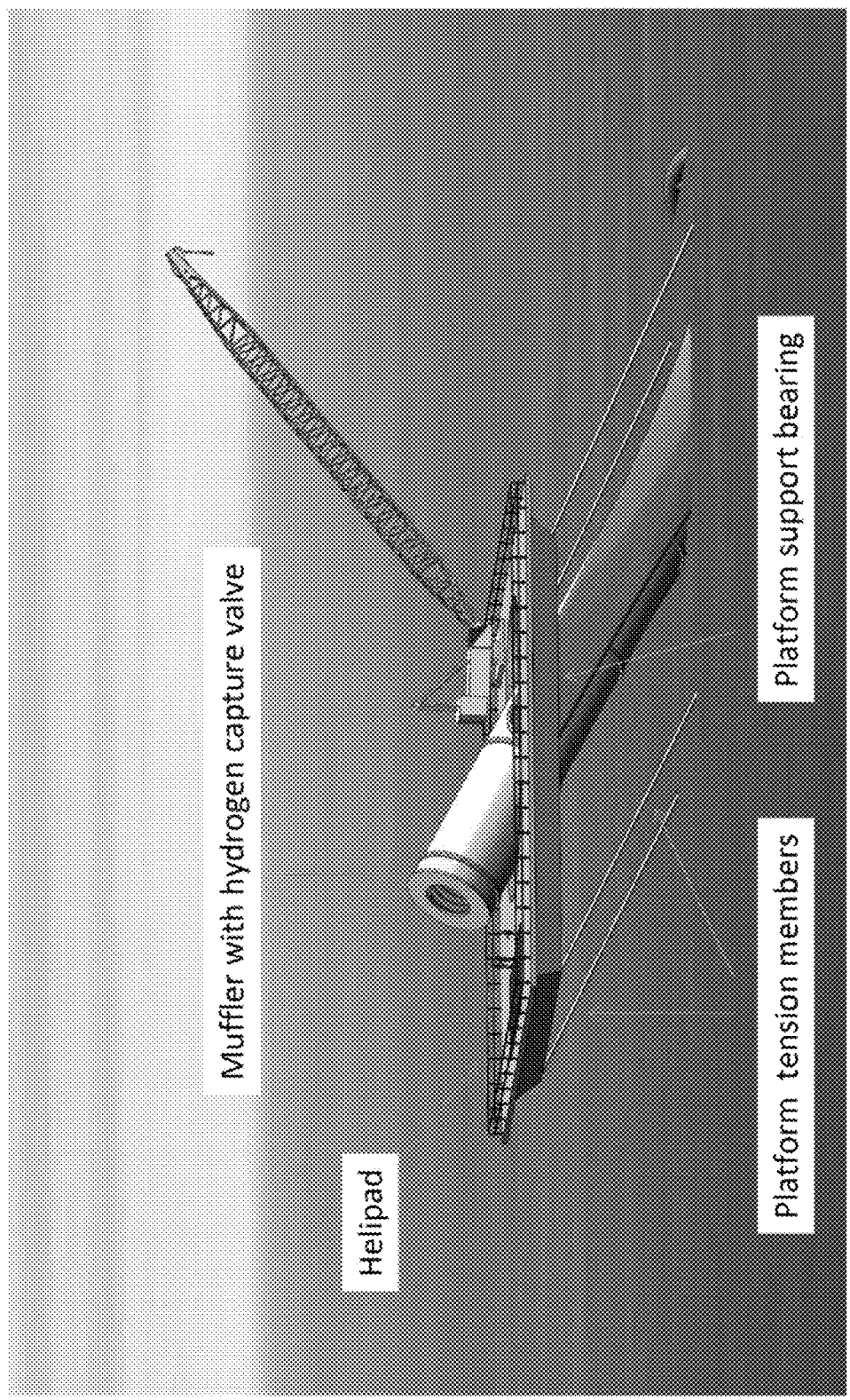
Figure 2. Muffler platform

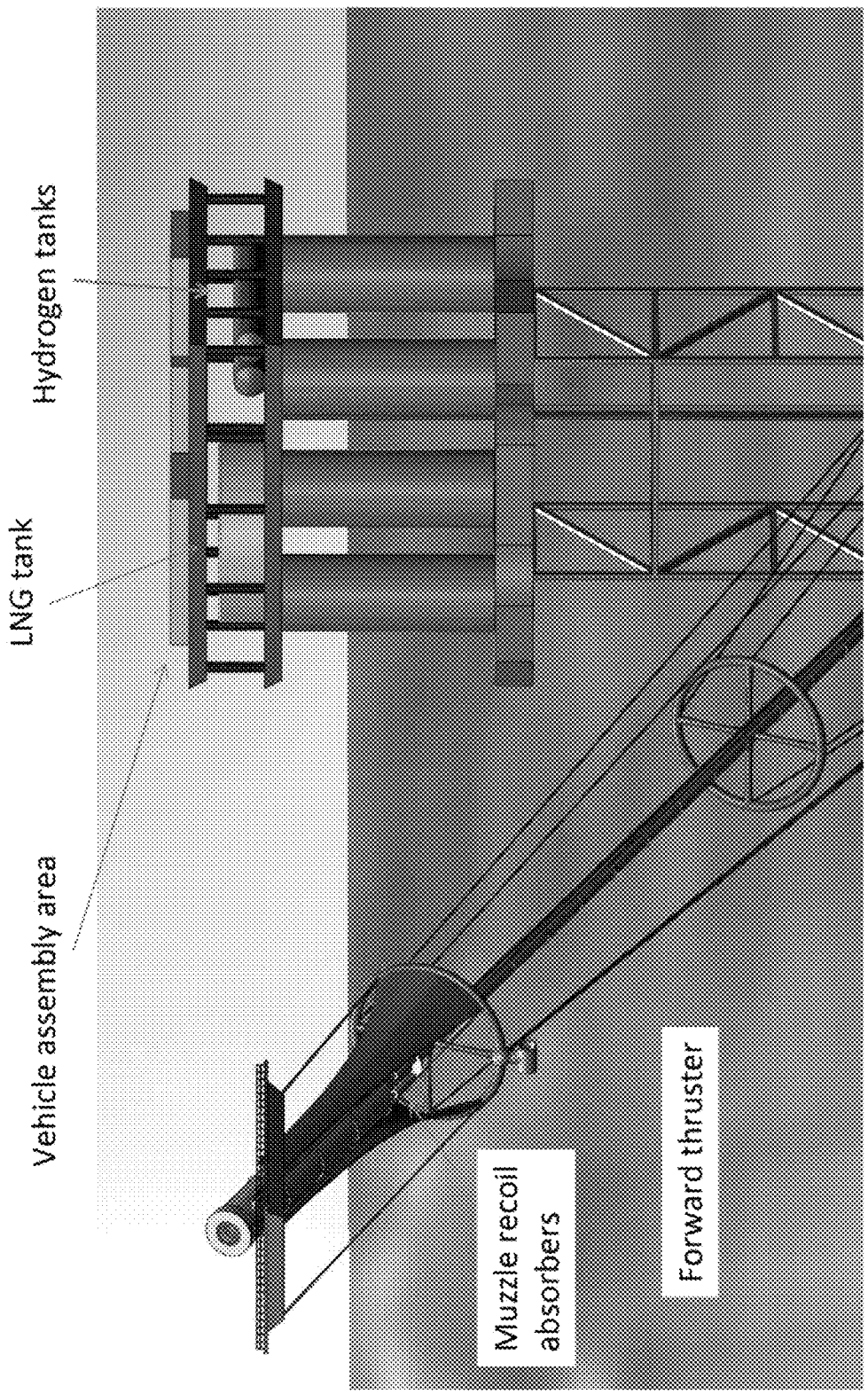
Figure 3. Muffler recoil mechanism and mobile maintenance platform

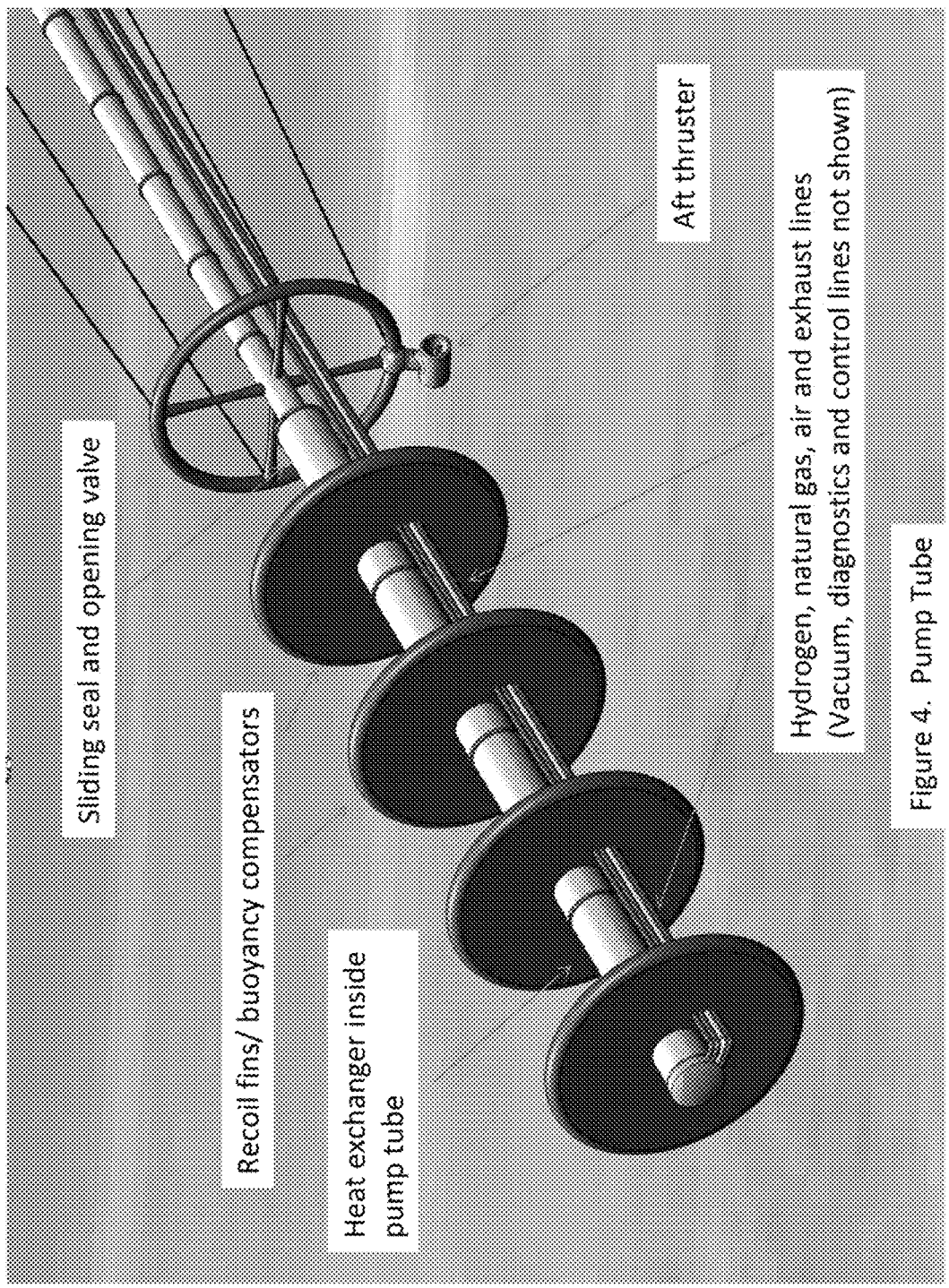
Figure 4. Pump Tube

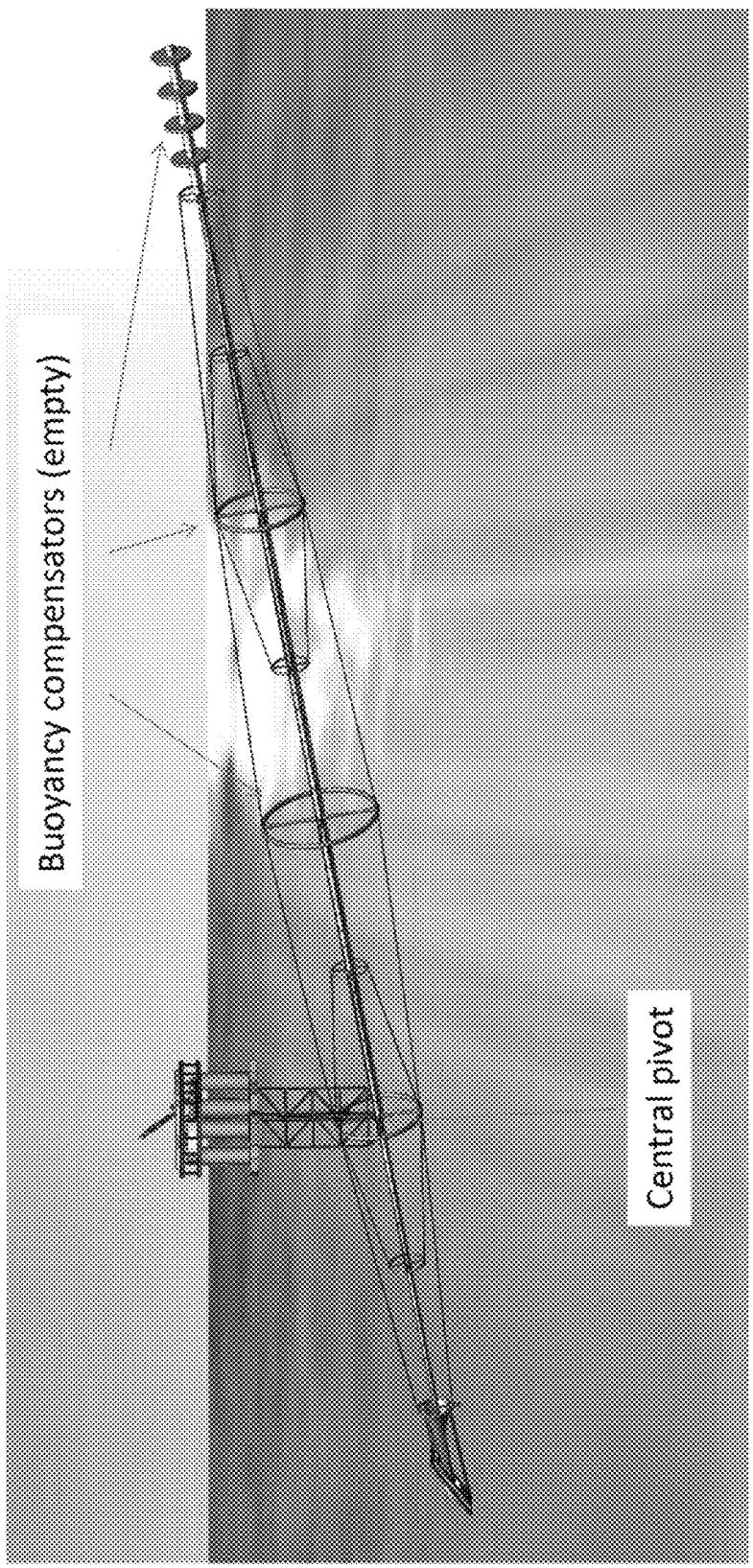
Figure 5. OBL with pump tube stowed for maintenance or transport

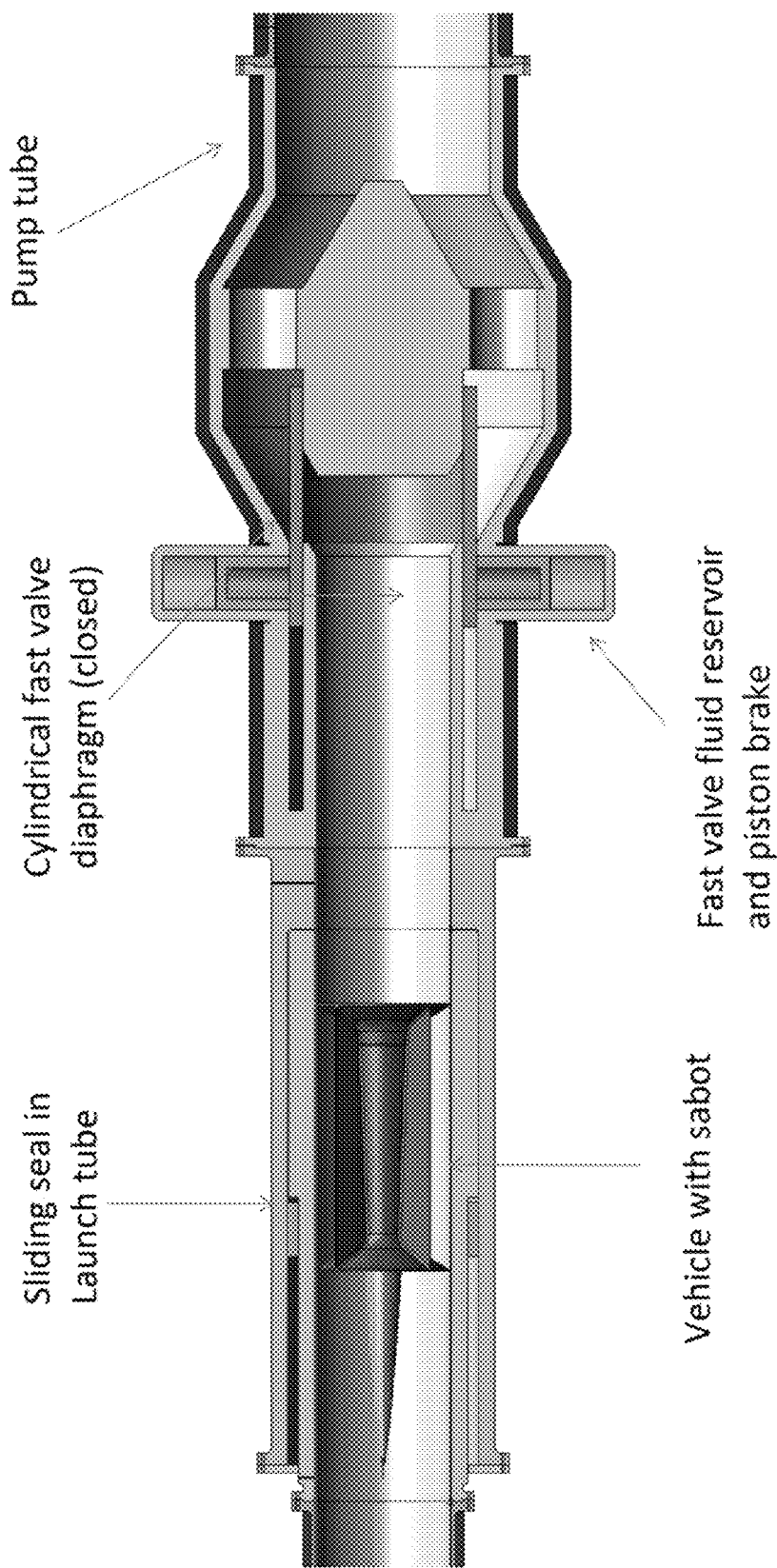
Figure 6. Vehicle pre-launch near sliding seal and forward of fast valve

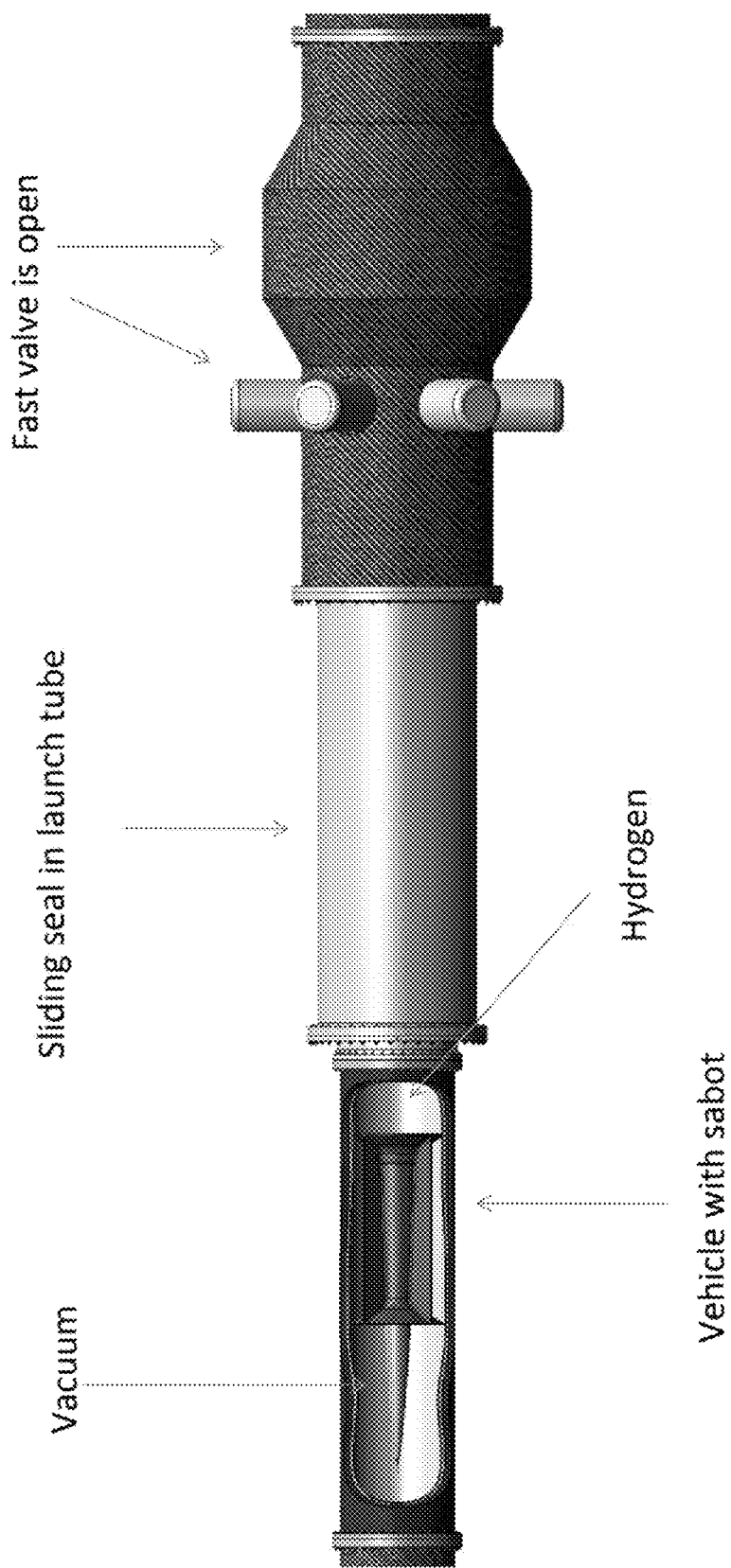
Figure 7. Cutaway showing vehicle accelerating during launch

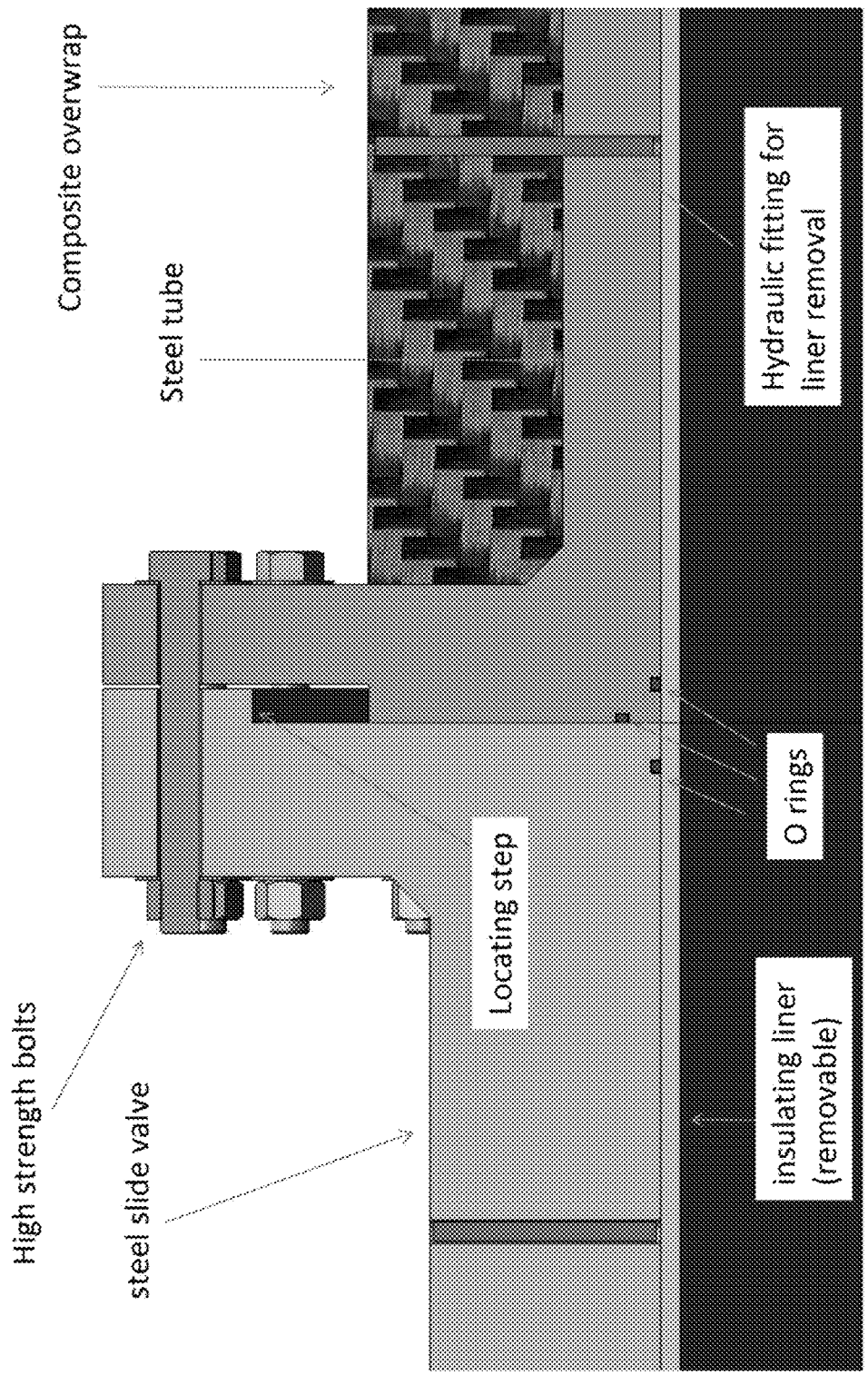
Figure 8. Flanges between sliding seal (L) and fast valve (R)

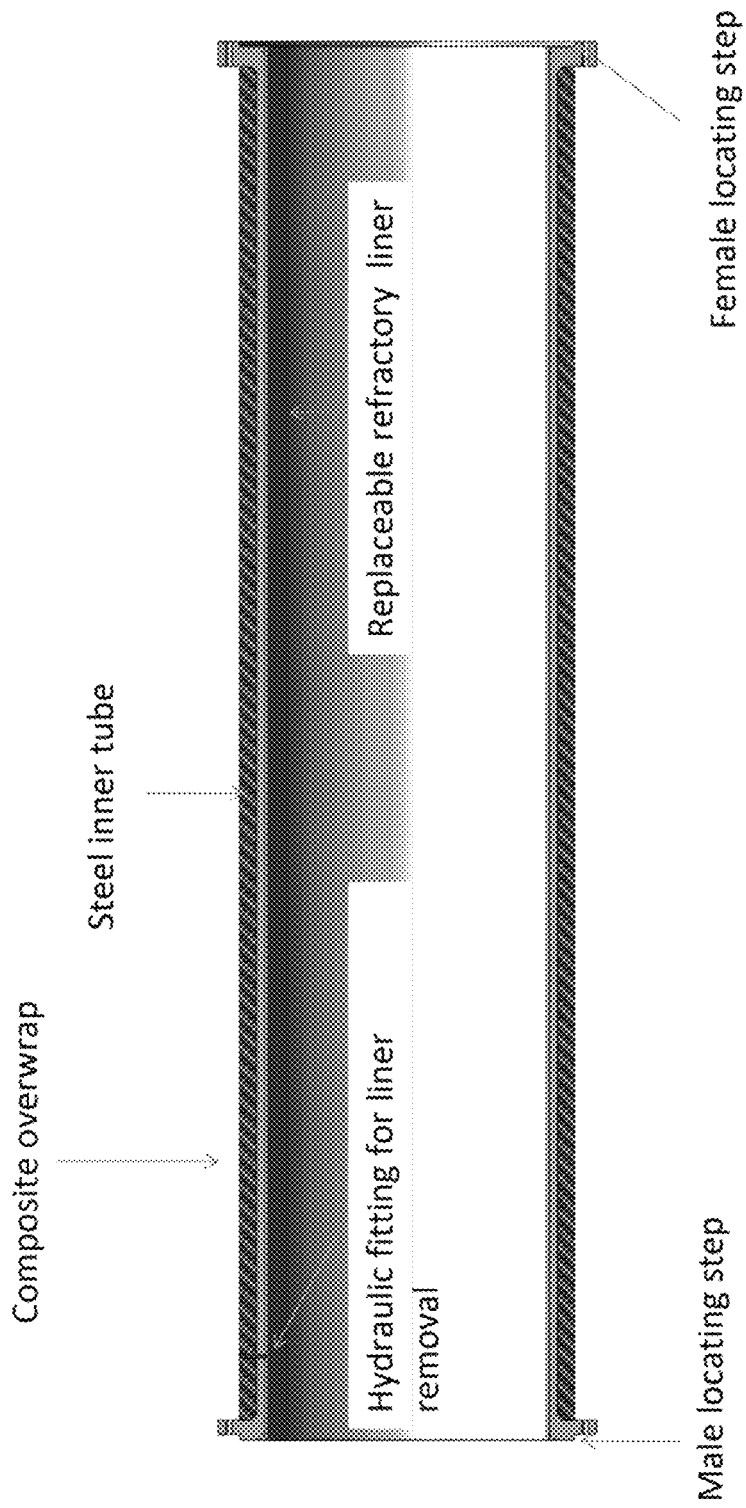
Figure 9. Composite launch tube (pump tube has insulating liner)

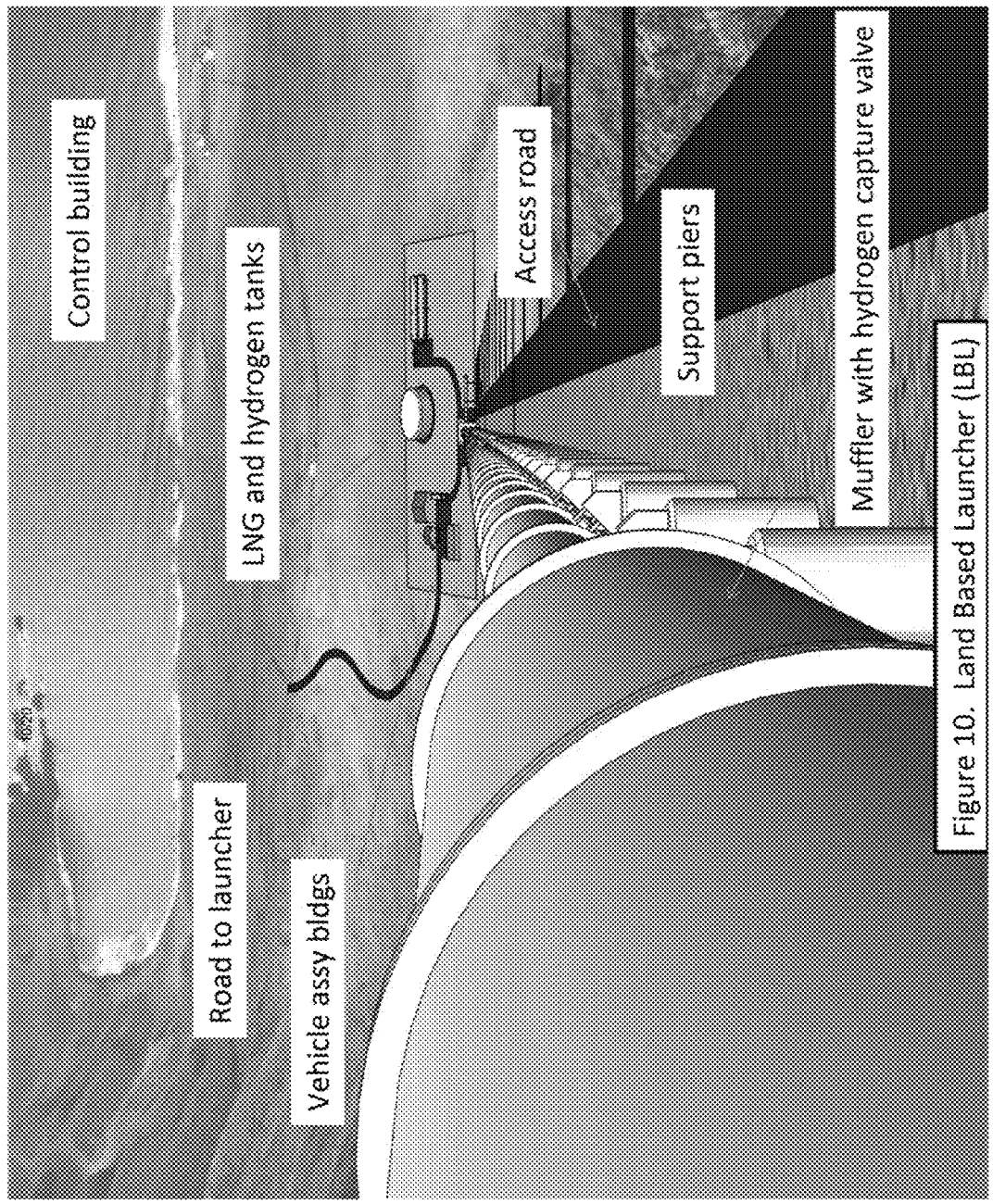
Figure 10. Land Based Launcher (LBL)

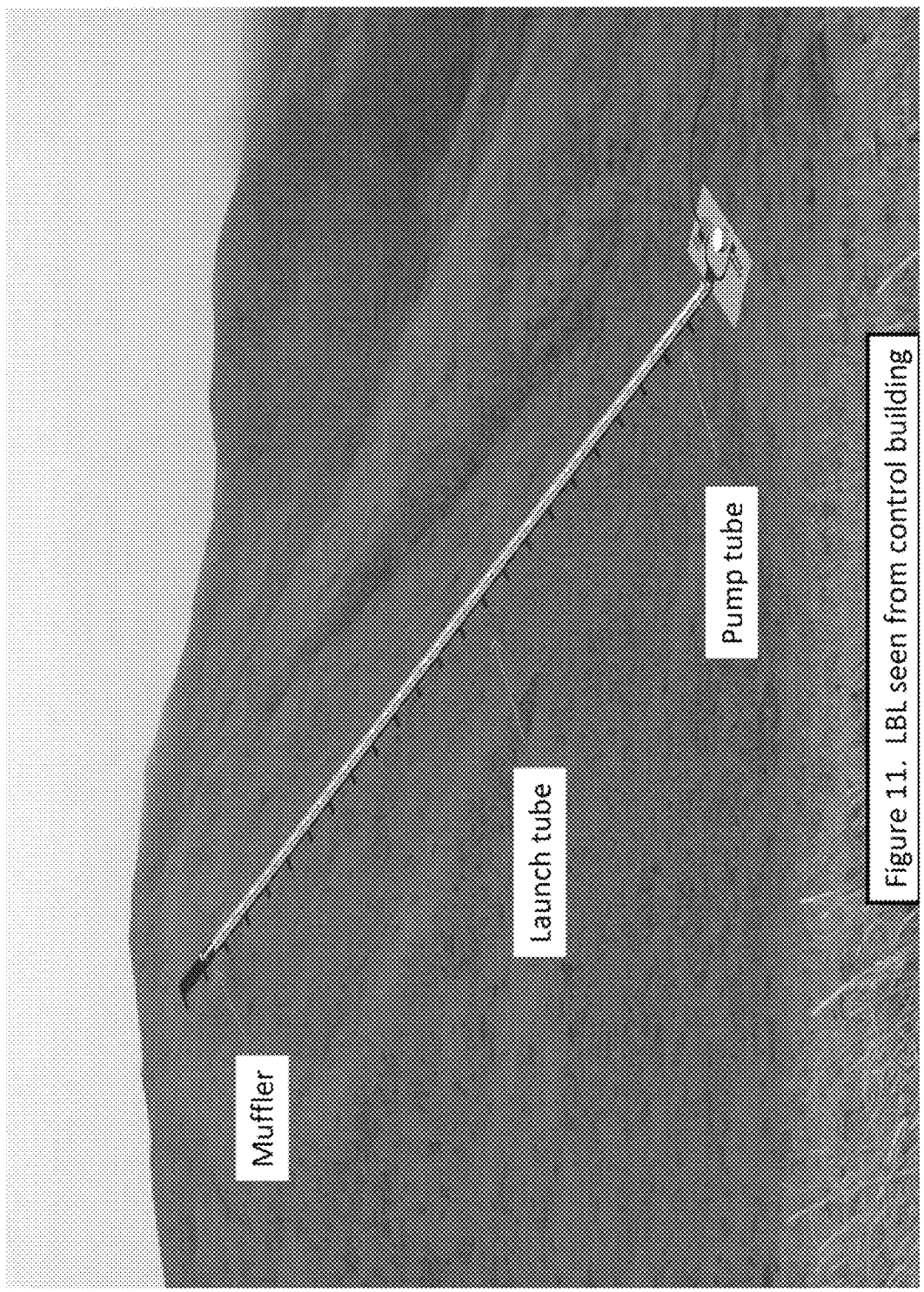

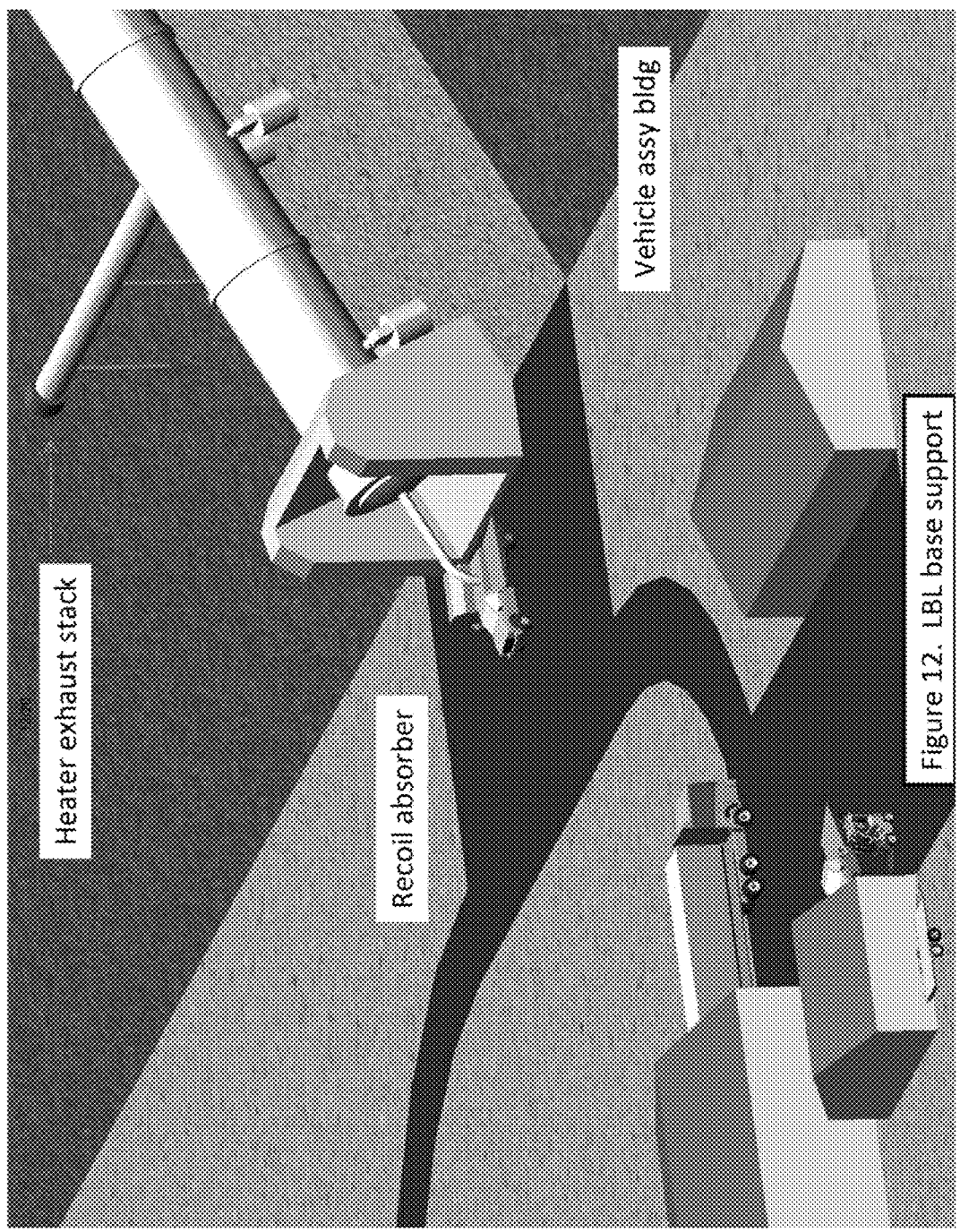

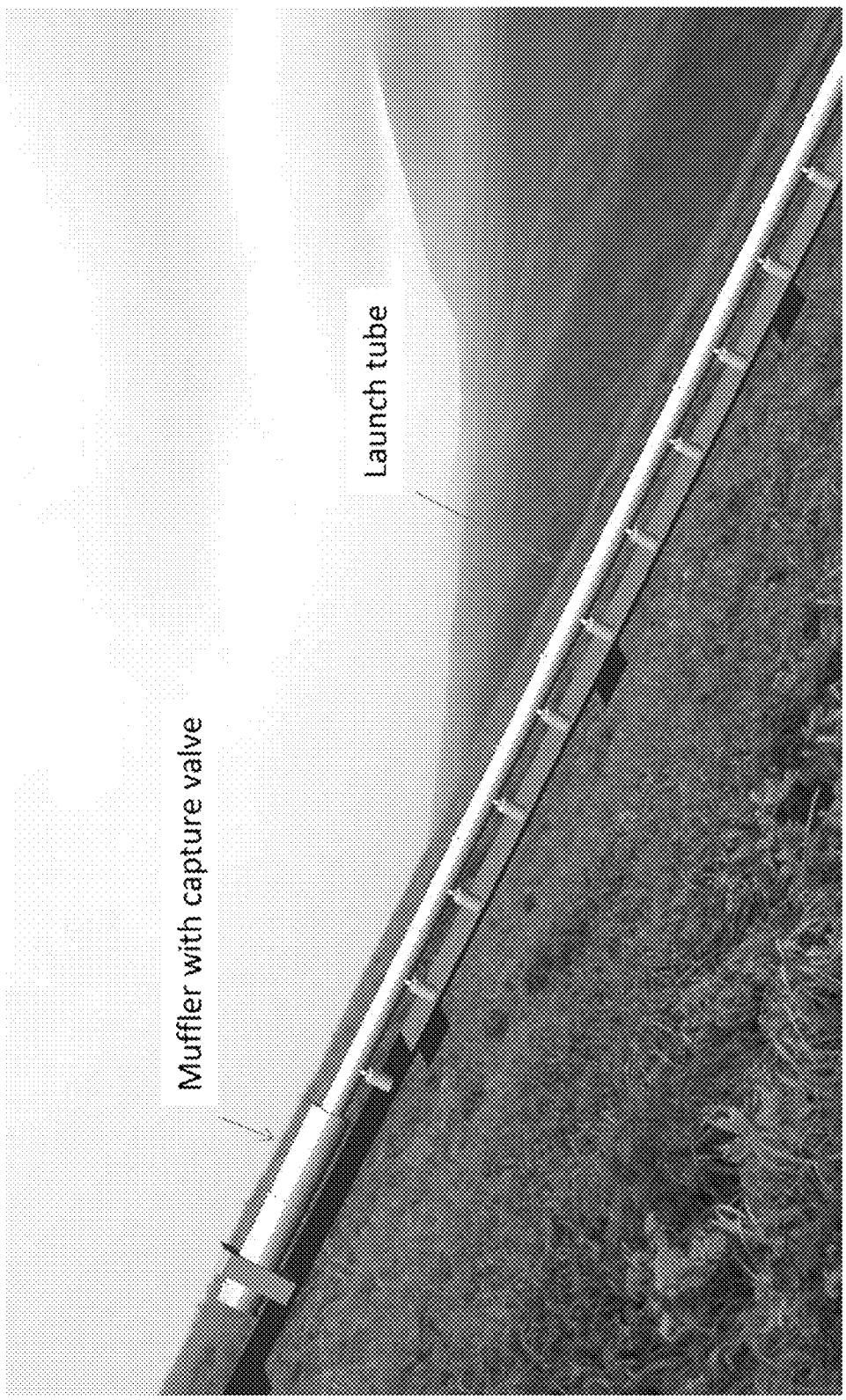
Figure 13. LBL side view

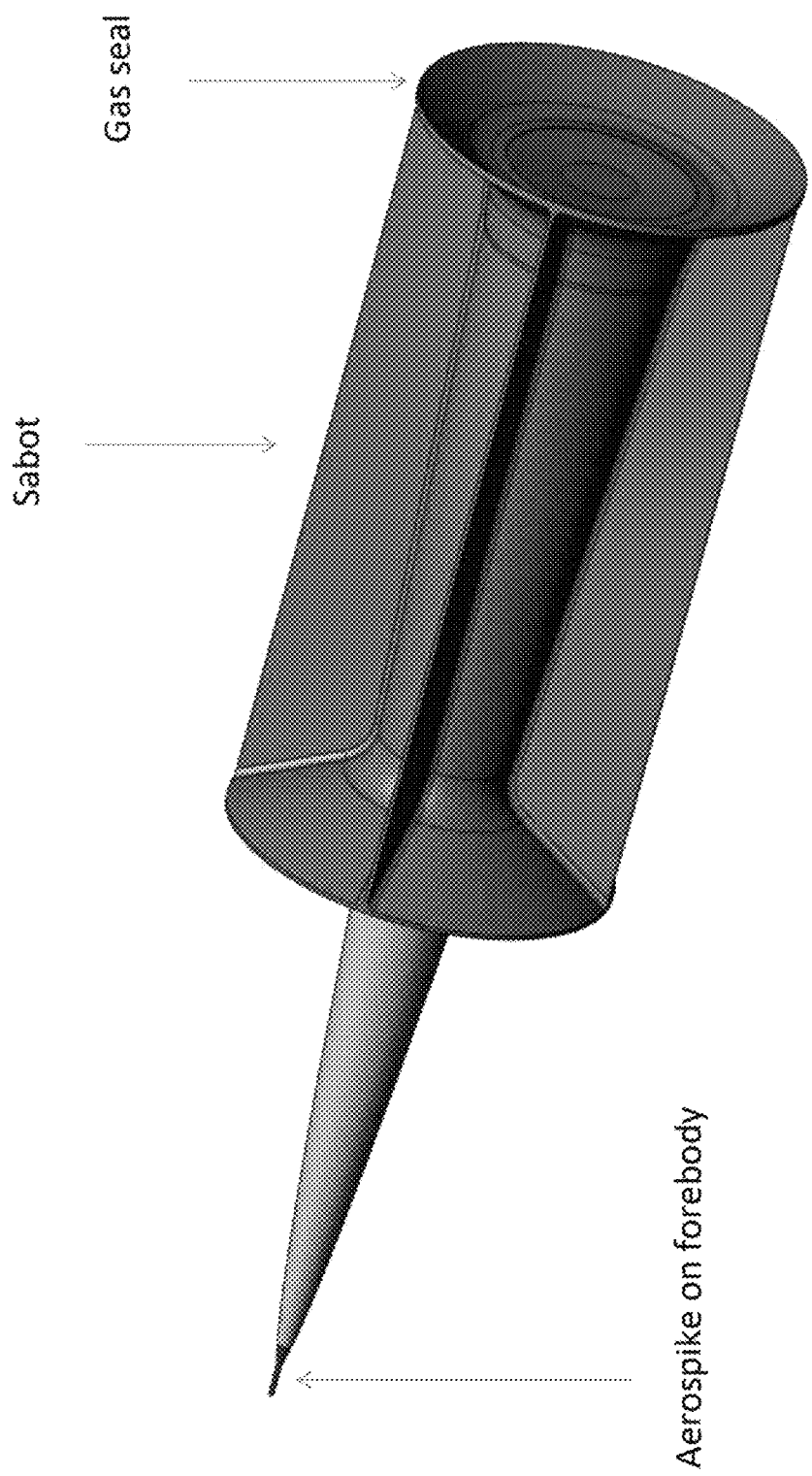
Figure 14. Vehicle with sabot

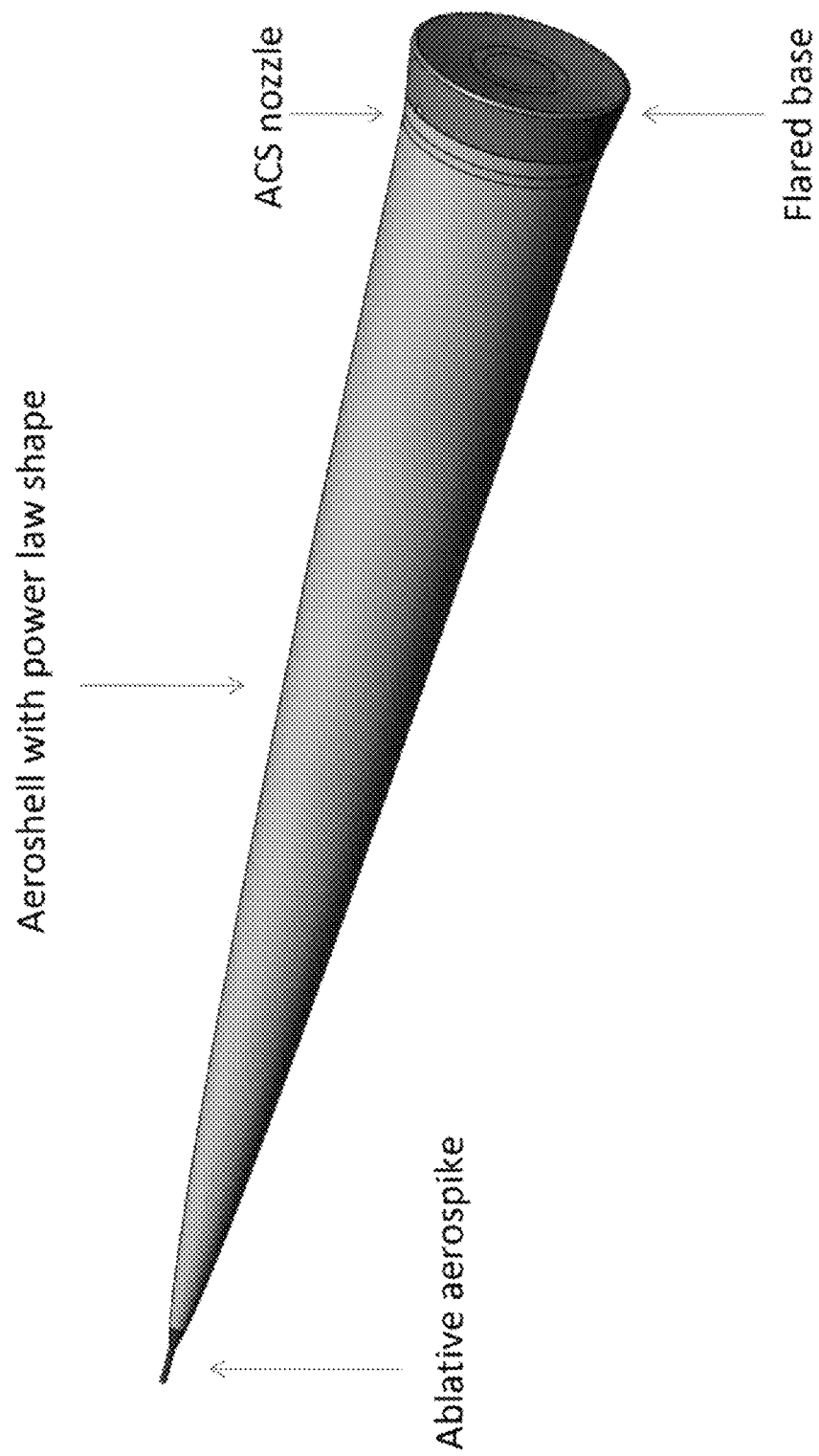
Figure 15. Vehicle aeroshell

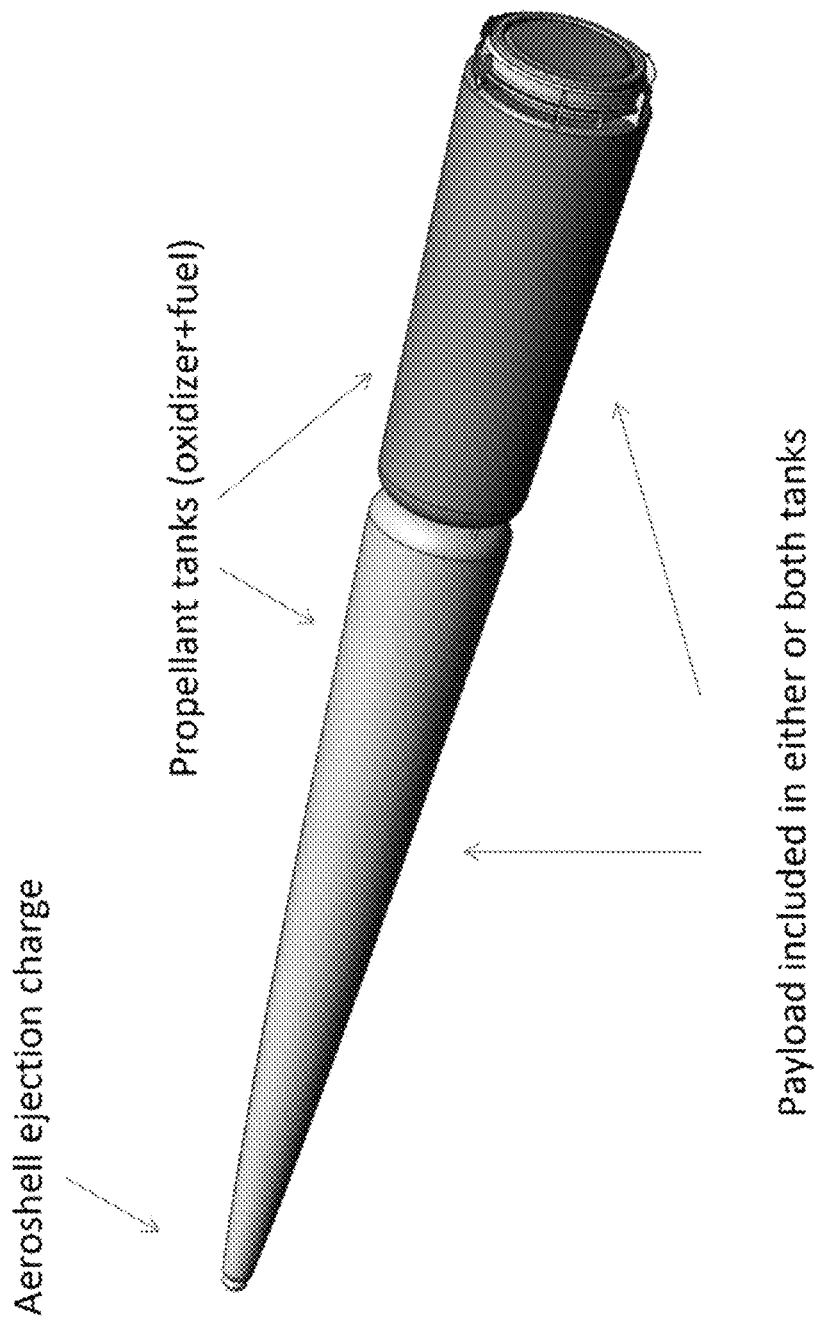
Figure 16. Rocket motor and payload

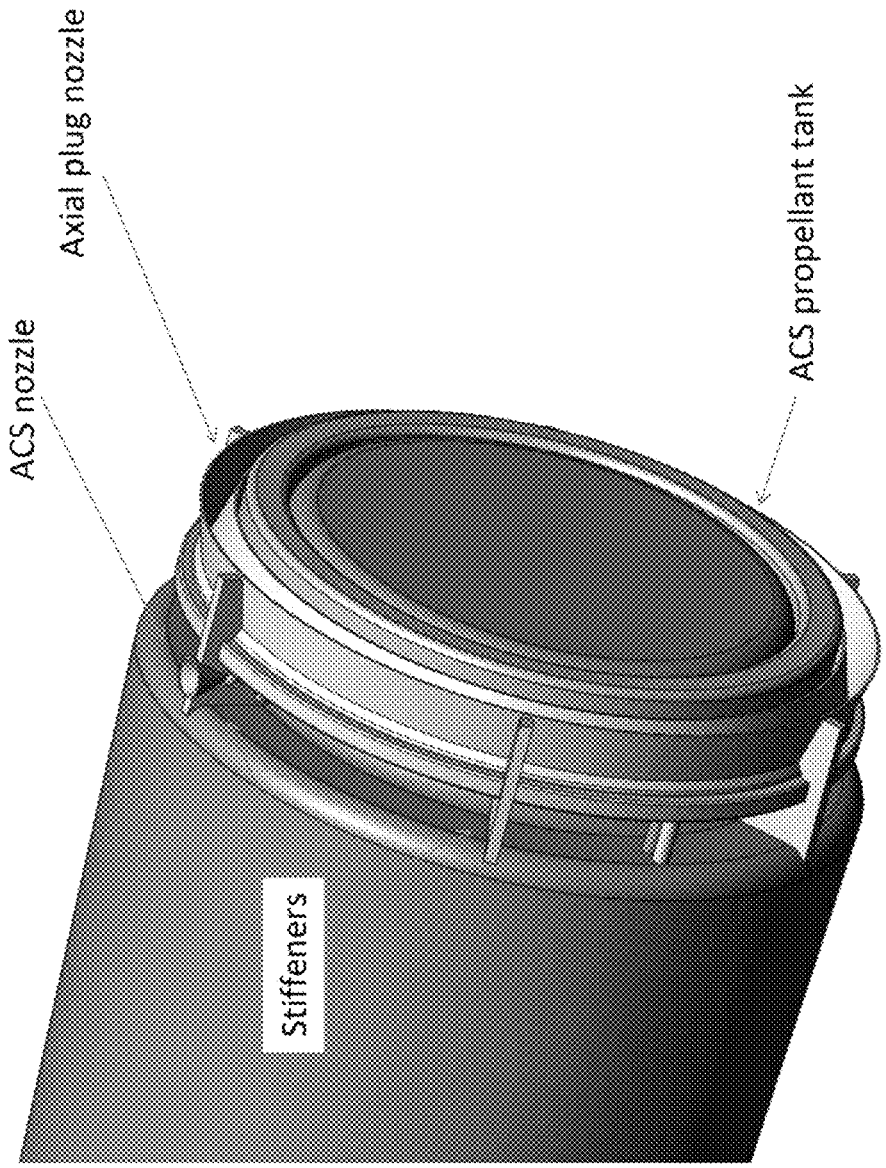
Figure 17. Rocket nozzle and Attitude Control System (ACS)

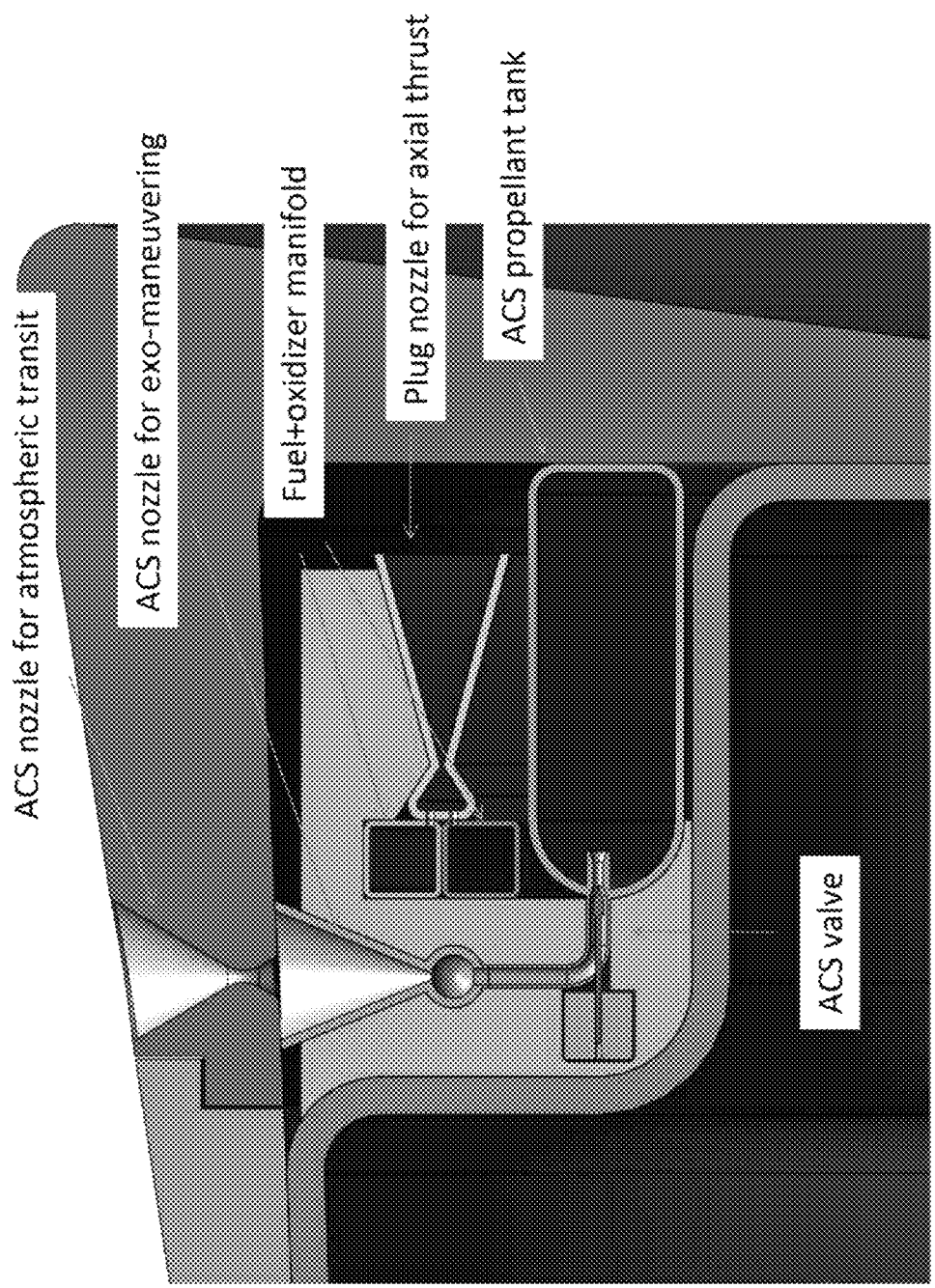
Figure 18. Close up of ACS and rocket nozzle

GAS GUN LAUNCHER

This application is a continuation of U.S. application Ser. No. 13/430,671 filed Mar. 26, 2012 and entitled "Gas Gun Launcher," inventors John Hunter, Harry Cartland, Philip Sluder, and Richard Twogood, which is a continuation of PCT/US2010/050437, filed Sep. 27, 2010 and entitled "Gas Gun Launcher," inventors John Hunter, Harry Cartland, Philip Sluder, and Richard Twogood, which claims priority to U.S. App. 61/277,544 and U.S. App. 61/277,543, each of which was filed Sep. 25, 2009. Each of the preceding applications is incorporated by reference herein as if put forth in full below.

TECHNICAL FIELD

The invention relates to a gun that employs a heated light gas to provide the initial acceleration for a projectile such as a missile which will subsequently produce further acceleration by employing its own propulsion system, especially such projectiles that carry a payload into orbit.

BACKGROUND

The expansion of a light gas working fluid, e.g. hydrogen or helium, at high temperature and pressure can accelerate projectiles to great velocity because of the fluid's very high speed of sound, which is proportional (in simplest form) to the square root of temperature over molecular or atomic weight. Consequently, light gas guns have a rich history dating back decades, with laboratory scale system performance matching today's best powder guns by the late 1940s, and later reaching earth escape velocity by the mid 1960s.

An older version of a missile receiving initial acceleration from a gas such as high pressure air or other gas is the subject of U.S. Pat. No. 3,583,277.

United States patent application publication 2010/0212481 discloses "[a]n improved two-stage light gas gun for launching projectiles at high speeds. The gun consists of three tubes: the expansion, pump, and launch tubes. The expansion tube contains a close-fitting expansion piston that is propelled by an explosive charge. The expansion piston in turn drives the pump piston housed within the pump tube by means of a rod connecting the two pistons. The action of the pump piston adiabatically compresses and heats a light gas of hydrogen or helium, bursting a diaphragm at a predetermined pressure and expelling the projectile from the launch tube at a very high speed.

U.S. Pat. No. 7,775,148 describes "launching payloads at high velocity uses high-pressure gas or combustion products for propulsion, with injection of high pressure gas at intervals along the path behind the payload projectile as it accelerates along the barrel of the launcher. An inner barrel has an interior diameter equal to the projectile diameter or sabot containing the projectile. An outer casing surrounds the inner barrel. Structures at intervals attach the outer casing and the inner barrel. An axial gas containment chamber (AGC) stores high pressure gas between the inner barrel wall, the outer casing wall, and enclosure bulkheads. Pressure-activated valves along the barrel sequentially release the high pressure gas contained in the AGC in to the barrel to create a [sic] continuously refreshed high energy pressure heads behind the projectile as it moves down the barrel. A frangible cover at the exit end of the barrel allows the barrel to be evacuated prior to launch. The launcher is rapidly recyclable. The valves close automatically after the projectile has exited the barrel, allowing a new projectile to be introduced into the breech and the AGC to be recharged with high-pressure gas."

U.S. Pat. No. 7,775,148, moreover, for one embodiment states, "[t]he elongated projectile launcher barrel is supported by flotation collars near breech and muzzle ends and is erected by flooding a flotation collar near the proximal end and submerging the breech end."

U.S. Pat. No. 6,116,136 uses recoil plates in an "actuated recoil absorbing mounting system" in order to "absorb the recoil energy from an underwater projectile launcher, such as a high discharge energy underwater gun."

In none of the preceding patents or any other patent of which the inventors are aware are the barrels, or tubes, buoyant; is the launch tube isolated from the pump tube; or is there an automatic alignment system.

In the 1990s, Lawrence Livermore National Laboratory (LLNL) demonstrated one thousand fold scaling of this technology with a view toward its application to low cost launch of payloads to space to, for example, place satellites in orbit or stage materials for space exploration. A common feature of conventional gas guns has been the use of adiabatic compression, typically employing a piston in two (or more) stages, to produce the required high temperature, high pressure light gas. See, for example, U.S. Pat. No. 7,945,413 Koth (2011) and U.S. Pat. No. 8,201,486 Fuhrman (2012), and references cited therein. Variations on this basic approach exist as well. See, for example, U.S. Pat. No. 3,131,597 A Gram, Jr. et al. (1964) wherein a more dense fluid, in this case steam, substitutes for a solid piston. As the work at Livermore showed, managing the adiabatic compression process at large scale can be inconvenient, if not problematic, due to the large amount of energy involved, and cycling such a system to prepare for subsequent launches is time consuming.

The present inventors have previously described using hydrogen gas guns to deliver payloads to orbit in the following published articles: "Livermore Proposes Light Gas Gun For Launch of Small Payloads", *Aviation Week and Space Technology*, Jul. 23, 1990, pp. 78-80; "Shooting Right For The Stars With One Gargantuan Gas Gun", *Smithsonian Magazine*, January 1996, pp. 84-91; and "The Jules Verne Gun", *Popular Mechanics*, December 1996, pp. 54-57. These described the construction and performance of the SHARP (Super High Altitude Research Project) launcher at LLNL as well as potentially larger follow-ons.

In addition, the present inventors in United States patent application publication 2012/0187249 A1 disclose a "pistonless" light gas launcher for placing payloads in orbit. The invention utilizes a heat exchanger for the purpose of creating in the large mass of light gas working fluid the conditions for high muzzle velocity. The current application provides additional details with respect to a heat exchanger that is well-suited to a gas gun launcher as discussed herein.

The present inventors have developed a means of launching satellites or delivering supplies to earth or lunar orbit in order to assist space exploration. The current method of delivering propellant, food and other supplies to orbit is with rocket delivery. Rocket delivery is extremely expensive with a typical cost of about $5,000-$10,000 per lb of payload delivered. The requirement for approximately 9 km s$^{-1}$ $\Delta V$ to attain earth orbit when coupled with the rocket equation yields only a few percent payload fraction for rocket delivery. The inventors' method uses a hydrogen gas gun to first boost a rocket to high speed. This allows a smaller more efficient rocket to deliver the payload to orbit. The payload fractions obtained are thereby much higher than obtained by a rocket alone. The higher payload fractions plus the reusable hydrogen gas gun, whose cost is amortized over many launches, reduce the payload delivery cost by more than a factor of 10.

SUMMARY

In one embodiment, the invention provides a gas gun launcher in which a launch tube is connected to a pump tube. The pump tube contains a heat exchanger that heats a contained volume of light gas used to launch a projectile such as a rocket propelled vehicle. The heat exchanger is contained in a chamber into which light gas is pumped from storage. The heat exchanger heats light gas within the chamber once the chamber contains a sufficient amount of gas for launch and raises the gas temperature and pressure to launch condition.

Light gas can be retained within the pump tube chamber by a fast-opening valve. Once the desired amount of gas is heated to an appropriate temperature, the fast-opening valve opens to expose the projectile to heated gas that accelerates and launches the projectile.

The gas gun launcher can have a sliding attachment such as a sliding seal connecting the launch tube and the pump tube. A sliding seal permits the pump tube to move during launch, principally to prevent a longitudinal wave from proceeding along the launch tube which would degrade the accuracy of a launch. A sliding seal also retains the gas within the launch tube and the pump tube.

A fast-closing valve at an opposite end of the launch tube can be configured to close quickly as soon as the projectile passes the fast-closing valve. Light gas is consequently retained within the launch tube and pump tube, and the light gas can be recycled in a recycle system in order to purify and/or store the light gas for reuse.

The fast-closing valve may be positioned at a muffler. The muffler can optionally be configured to move during launch, just as the pump tube moves during launch, to reduce launch tube recoil. Consequently, the muffler may also have a sliding attachment such as a sliding seal that connects the muffler and launch tube.

A launch tube alignment system is preferably automatic. Straightness is critical to ensuring the structural integrity of the vehicle against side loads, and improves launch accuracy.

Further, an embodiment of the gas gun launcher suitable for use in water such as an ocean or large lake preferably utilizes a neutrally buoyant launch tube and a neutrally buoyant pump tube.

The current invention provides both land and ocean based light gas guns. Both the Land Based Launcher (LBL) and the Ocean Based Launcher (OBL) may provide one or more of the following:

1. Obtaining vehicle muzzle velocity commensurate with orbital speeds with the launcher. The advantage of using hydrogen is that it has 1/10 the molecular weight of gunpowder combustion products and this manifests itself in a much higher sound speed by comparison. The maximum theoretical ("escape") velocity of any gas based gun is:

$$U_{esc} = \frac{2}{\gamma - 1} C_0 \qquad \text{Eqn. 1}$$

where $C_0$ is the initial sound speed and $\gamma$ is the specific heat ratio. Equation 1 is the basis for the fact that the world record for powder guns is 3 km s$^{-1}$ while that for hydrogen guns is 11.2 km s$^{-1}$. The speeds associated with attaining low earth orbit (LEO) at 500 km altitude are well matched to hydrogen guns. Specifically, $V_{orbit}$=7.6 km/s $\Delta V_{orbit}$=9.0 km/s where the higher "delta" is required to accommodate drag and gravity losses.

2. Using "pistonless" hydrogen gas guns to reduce the amount of velocity needed by a rocket to provide payload to orbit. Eliminating the piston simplifies recoil management and reduces the size of the launcher.
3. Minimizing the carbon footprint and pollution by using natural gas or liquid hydrocarbons to heat the hydrogen. This is much cheaper, cleaner and safer than the gunpowder used to propel the piston in a conventional two-stage hydrogen gas gun, and eliminates most of the emissions associated with large expendable launch vehicles, e.g. HCl, $Al_2O_3$, etc.
4. Decoupling the recoil from the launch tube thereby eradicating launch vibration and allowing a lighter, lower inertia launch tube. Traditional gas guns have very heavy thick walled launch tubes since they experience extreme vibrations during the shot. The high velocity nature of hydrogen gas guns demands a static launch tube during the shot. Otherwise the vehicle may be damaged by the transverse g-loads as it traverses the launch tube. Here the pump tube slides backwards with a sliding seal between itself and the launch tube thereby mitigating launch tube recoil.
5. Aligning the launch tube automatically. Launch tube alignment is critical for high velocity guns and must be performed before every launch. It can be an onerous and expensive task when performed by surveying crews. Automatic alignment will reduce operation and maintenance costs and save time.
6. Having a fast-opening valve that tailors the pressure profile at the projectile as it traverses the barrel. This allows a lower peak g-load on the projectile. Typical single stage gas guns have maximum pressure occurring near the breech and this causes very high initial g-loads. Conversely two-stage piston driven gas guns have lower peak pressures at the expense of a massive piston. A particular valve provided herein initially allows modest hydrogen release until the vehicle is some fraction (preferably about 1/3) of the way down the launch tube. The valve, having opened more by then, allows the vehicle to be exposed to peak gas pressure.
7. Having a fast-closing muffler to capture the majority of the hydrogen and allowing the hydrogen to be recycled. This reduces launch costs and reduces muzzle blast as well.
8. Having a mechanism to impart spin to the vehicle. The advantages to the vehicle include greater flight stability, lower peak stress and heating and the ability to use a novel, single thruster Attitude Control System (ACS).

The Ocean Based Launcher can have one or more unique attributes, such as:

1. High mobility since the OBL may be towed and deployed in any preferred ocean including international waters. Mobility results in flexibility compared to both standard rocket systems and LBLs, which are typically constrained in launch inclination.

2. Agility in azimuth and launch angle, which allows launch access to all orbital altitudes and inclinations. For example, a single OBL can launch several tons at 25 degree launch angle to a propellant depot at equatorial inclination and 500 km altitude in the morning. It can then rotate to a 60 degree launch angle and deliver several tons to a depot at a geosynchronous altitude later on the same day.
3. Neutral buoyancy, which reduces launch tube gravitational sag to near zero. This means the launch tube can be very straight and will require less adjustment and fewer stiffeners. An extremely straight launch tube is paramount to minimize side loads on the launch vehicle. Neutral buoyancy also means the system is much lighter, potentially cheaper and more easily transported than an all steel system.
4. Immunity to seismic activity. Some land-based systems may be located near regions of earthquake activity and active faults. The OBL will be immune to seismic activity. It will obviously have to deal with potentially energetic wave action. Tsunamis are expected to be of small consequence since their amplitude is low in deep waters.
5. Enhanced range safety, since the launch location will be away from populated areas with an ocean downrange.
6. Hurricane avoidance, which is easily managed by deploying the OBL within 5 degrees of the equator where hurricanes do not occur. (The Coriolis Force that organizes hurricanes is proportional to the sine of the latitude.)

A launch vehicle may have one or more of the following traits:
1. It has a sabot as shown in FIG. 14 that allows a larger working area for the hydrogen pressure. This gives the vehicle greater velocity for a given hydrogen pressure.
2. It has a sacrificial aerospike at the nose to reduce the heat transfer on the forward part of the vehicle. The aerospike will ablate several inches during atmospheric flight. The advantage is the aeroshell fore-body is substantially away from the high speed air stagnation point at the aerospike tip and hence will not heat and ablate excessively. The aerospike will also ensure a more uniform vehicle profile during atmospheric egress.
3. It preferably spins about the long axis thereby averaging out aerodynamic moments and heating. This reduces peak bending forces and hot spots. As well, spinning enhances inertial stability and averages out the effects of any main rocket motor thrust axis misalignment.
4. It preferably has an Attitude Control System that only requires one nozzle. This works in conjunction with a spinning vehicle and an intelligent controller. The advantage is a much lower part count and weight than a traditional ACS, which usually has multiple nozzles.
5. It preferably has propellant tanks that can carry both the propellant and the payload. This is because the payload may be rocket propellant such as $LH_2$, LOX or RP1, while the vehicle uses the same propellant. The use of "oversize" tanks will reduce the part count and weight of the vehicle.
6. It preferably has a plug nozzle. The advantage is a much shorter, compact nozzle than a conventional central nozzle. This will increase ruggedness under the high launch g-loads. It will also allow for a more compact and lighter vehicle, and enables the employment of centripetal propellant pressurization.
7. It preferably has a centripetal fuel pump based on vehicle rotation. The rapidly spinning vehicle can generate significant hydrostatic propellant pressures at the periphery of the propellant tanks. Propellant can then be fed through a pressure regulator to the plug nozzle. The advantage is in eliminating a turbo-pump or pressure bottle that is ordinarily used to pressurize the propellant. This will save weight and reduce cost.
8. It preferably has liquid propellant composed of an oxidizer and a fuel. One advantage is no in-bore detonations in the event of vehicle break up in the launcher. Other advantages include higher specific impulse as well as the ability to throttle, terminate and restart thrust.

The pump tube and heat exchanger assembly of the present invention conditions a large mass of light gas to high temperature and pressure. The so-conditioned light gas reservoir initially contained within the pump tube can subsequently propel a launch vehicle to very high velocity. As applied to space launch, the reservoir can supply some or most of the energy required for the vehicle to travel to very far range and height, or to reach orbit.

BRIEF DESCRIPTION OF DRAWINGS

FIG. 1 shows an Ocean Based Launcher from the side.
FIG. 2 shows the OBL muffler and its maintenance platform.
FIG. 3 shows the muffler recoil mechanism and both maintenance platforms.
FIG. 4 shows the submerged pump tube.
FIG. 5 shows the OBL in stowed position.
FIG. 6 shows a cutaway view of the vehicle near the sliding seal and fast valve.
FIG. 7 shows the vehicle accelerating during a launch.
FIG. 8 shows the flanges between the sliding seal and fast valve.
FIG. 9 shows a section of composite neutral buoyancy launch tube.
FIG. 10 shows the Land Based Launcher as seen from the muzzle.
FIG. 11 shows the LBL seen from the control building.
FIG. 12 shows the LBL base support.
FIG. 13 shows the LBL launch tube side view.
FIG. 14 shows the launch vehicle with sabot.
FIG. 15 shows the vehicle aeroshell.
FIG. 16 shows the rocket motor and payload.
FIG. 17 shows the rocket nozzle and Attitude Control System.
FIG. 18 shows a close up of the ACS and rocket nozzle.

MODES FOR CARRYING OUT THE INVENTION

A pump tube shown in FIGS. 1, 4, 8 and 12 is composed of flanged sections made from steel tubing with high strength composite fiber overwrap. The thickness ratio of composite to steel is tailored in one instance to achieve neutral buoyancy. Note that typical composites have densities of about one-fifth that of steel while they are very strong in tension. Since the composite is only strong in the fiber direction, one will typically employ a winding angle to give the tube both hoop strength as well as longitudinal strength. The present example case of 15 ksi internal pressure uses about six inches of Toray graphite composite wrapped around a 3 inch thick high strength steel tube, with a 100 inch inner diameter (ID). This construction gives a safety factor of approximately three on yield assuming 15 ksi internal pressure.

The OBL preferentially uses the neutral buoyancy tubes submerged in the ocean to minimize gravitational loads and hence tube distortion. The LBL has the option to use composites as well and in this case benefits from the reduced weight and distortion, and potentially lower cost. The pump tube also has an insulating liner that reduces hydrogen heat transfer to the walls. The pump tube contains a heat exchanger that uses the heat of combustion of natural gas or other hydrocarbons and air to heat hydrogen.

The pump tube has buoyancy compensators, in the case of the OBL, that also serve as recoil fins as in FIG. 4. The compensators have sufficient area to dampen the pump tube recoil after a motion of several meters. One can use recoil fins, or one can use conventional shock absorbers that loosely couple the launch tube to the pump tube in a LBL, for instance.

The pump tube has a gas manifold shown in FIG. 4. The manifold has remote valves and sensors that allow for the addition of hydrogen as well as evacuation or purging with air or another gas. The manifold also admits natural gas or other fuel and air destined for the heat exchanger, and allows venting of the heat exchanger exhaust products. The heat exchanger is located in the bottom of the pump tube and the heated hydrogen will rise and have some stratification with the hottest hydrogen nearest the launch vehicle, which is in the first section of launch tube. The stratification is beneficial, since the highest temperature and hence sound speed occurs nearest the vehicle where it will produce a higher speed than with no stratification.

The pump tube conditions and stores the high temperature (approximately 1700 K typical), high pressure (approximately 100 MPa typical) light gas prior to its release from the pump tube's chamber through a fast-opening valve and into the launch tube, accelerating the launch vehicle to its desired muzzle velocity (6 km s$^{-1}$ typical for hydrogen) over the length of the launch tube. As one of ordinary skill recognizes from e.g. FIG. 6, the ID of the pump tube can be larger than that of the launch tube.

A reusable fast-opening valve is located in the pump tube near the sliding seal in the launch tube as shown in FIGS. 6 and 7. The valve diaphragm is initially clamped in the closed position by the force exerted by the radially oriented hydraulic pistons. When hydraulic pressure is released the diaphragm opens rapidly enough to allow the hydrogen to push the vehicle at high speed down the launch tube. (Optional technology to the hydraulic pistons includes, but is not limited to, piezoelectric devices and squibs.) When the valve is initially opening, some hydrogen gas is released such that the vehicle accelerates yet does not see peak pressure until about ⅓ of the way down the launch tube. This reduces the peak stress on the vehicle. A sliding seal shown in FIG. 6 is located between the fast-opening valve and the launch tube on the OBL to retain the gas since the launch tube slides into the pump tube, rather than being connected to the pump tube, in order to decouple and thereby prevent a longitudinal wave at launch from traveling to the launch tube and interfering with the accuracy of the launch when the pump tube recoils from the launch tube. Prevention of the longitudinal wave in the OBL is further aided by the recoil fins/buoyancy compensators. The LBL can instead have the base of the pump tube coupled directly into the reinforced concrete structure (see recoil absorber in FIG. 12). If necessary, when the concrete structure is used as a shock absorber, the LBL pump tube can have a sliding seal similar to the OBL. Having a sliding connection and shock absorber system (recoil fins or recoil absorber), furthermore, aids in preventing separation of the launch tube from the pump tube.

The valve accelerates prior to opening and the flow area increases from zero to full area in a short time thereafter. By tailoring both the shape and mass of the cylindrical diaphragm as well as the empty volume behind the vehicle, one can insure that peak pressure at the vehicle base occurs when the vehicle is at a desired location. (About ⅓ of the way along the pump tube is much better in terms of reducing peak g-load.)

The cylindrical fast valve diaphragm is illustrated in FIG. 6. The inventors have built this version and indicate that it works well. The way it works is the hydrogen acts on the rear edge to push it to the left. Upon the release of the fast valve piston brake (FIG. 6) the item accelerates via $m(dv/dt)=P\cdot A$. The hydrogen starts to flow once the item has moved past the interior male part. The flow rate is set by the increasing flow area as well as the volume behind the projectile. There is a finite fill time for the hydrogen pressure to ramp up behind the projectile. Meanwhile as the hydrogen pressure is rising, the projectile starts to move and then one sees essentially unsteady 2-D gasdynamic flow. A person of ordinary skill in the field of gasdynamics can run a 2-D gasdynamic code like Fluent and readily adjust the parameters (item mass, shape, distance item must accelerate before hydrogen starts to release, initial volume behind the projectile) to obtain the desired feature of where along the launch tube the pressure peaks at the projectile base.

The launch tube is constructed similarly to the pump tube, however, it has a replaceable refractory liner. Straightness is at a premium here since the vehicle is traveling at high speeds. Waviness in the OBL and the LBL launch tubes is reduced by means of an automatic launch tube alignment mechanism, which senses misalignment. The OBL waviness will then be corrected by differential tension applied to the cables shown in FIGS. 1, 3 and 5. The LBL will instead use threaded actuators to align the launch tube.

Both the OBL and LBL can use similar sensors to determine misalignment and mechanisms to correct misalignment. Ludeca offers a commercial laser/optical device to determine misalignment. (See www.ludeca.com/prod_borealign-bore-alignment.php.) The inventors' preferred method has three precision tubes rigidly attached externally to the launch tube. The Ludeca bore alignment devices are located inside the tubes and sense misalignment as described in Ludeca's brochure. Alternatively, the devices can travel inside the launch tube prior to the launch.

Once misalignment is determined the OBL can apply tension to the tensioning cables shown in FIG. 1. The amount of tension per cable will be a determined from a lookup table based on previous calibration testing of the launcher alignment. Screw type actuators will either tension or relax the tension members.

The LBL alignment forces are applied in a different fashion from the OBL due to the simple piers attached to the earth (FIGS. 10-13). The inventors align the LBL launch tube mechanically using two set screws per pier giving X and Y displacement (Z is the barrel direction). This is the same method employed on SHARP at LLNL.

In both the OBL and LBL cases, alignment sensing and adjustment will be carried out remotely with the help of commercial control system equipment, e.g. a Labview/Trio motion control system or a standard Programmable Logic Controller. Preferably, a human confirms final alignment prior to each launch.

Circular cable support members shown in FIGS. 1 and 5 are distributed along the OBL launch tube. These help stiffen the launcher. They are hollow and, as do the recoil fins/buoyancy compensators, also provide buoyancy compensation as needed. (One of ordinary skill in the art would know how to adjust the air/water ratio in the circular cable support members and in the recoil fins/buoyancy compensator as necessary to achieve the desired buoyancy and launcher angle.)

The male locating step and female locating step in FIG. 9 assist in more accurately joining and aligning the launch tube and the pump tube than can be accomplished by placing bolts in the pattern of apertures on the flanges of the launch tube and the pump tube.

The composite construction muffler in FIGS. 2 and 3 is larger in diameter than is the launch tube. It is connected to the end of the launch tube by a sliding seal. There is at least one fast-closing valve in the muffler, discussed more below, that captures the hydrogen after the vehicle has exited the launcher. Shock absorbers are attached to the muffler and the launch tube preferably near the sliding seal. They absorb the hydrogen forward momentum at the muzzle allowing the muffler to recoil forward without sending a longitudinal wave down the launch tube and thereby altering the alignment of the launch tube.

Maneuvering thrusters shown in FIGS. 3 and 4 are attached at least to the fore and aft cable support members of the OBL. These thrusters allow the operator to maneuver the OBL and set launch azimuth.

There is preferably a Maintenance Platform (MP) as shown in FIG. 3 that is constructed similarly to a free floating oil platform. The MP is connected near the center of the OBL with a bearing attached to the launch tube. The bearing allows rotation of the launch tube about a horizontal axis. The MP contains the liquefied natural gas or other fuel, and hydrogen tanks as well as vacuum pumps, compressors and electrical power and generators. The MP has a control room with radar, communications, crew quarters, a cafeteria and a sick bay. It also has a helipad and a vehicle storage and assembly building. A ship or floating platform could, however, also accomplish the functions of the MP.

There is, also preferably, a smaller Muffler Maintenance Platform (MMP) shown in FIG. 2 that is attached to the launch tube but not attached to the muffler. The MMP has a helipad and a work area complete with an automated vehicle loader. There is also a combination launch tube inspection device and hone. Again, though, a similarly equipped ship or floating platform could accomplish the functions of the MMP.

As a theoretical example, a launcher could have a pump tube with an internal diameter of 4 meters and a total length of 100 meters. It would be joined to a launch tube 1,000 meters long with an ID of 2.5 meters. The muffler at the end of the launch tube would be 5 meters in internal diameter and 50 meters long. The heated hydrogen just prior to the shot would be at 15 ksi and 1,700 Kelvin. The launch vehicle would weigh about 3 tons and deliver 1,000 lbs of payload to a depot in LEO at equatorial inclination.

The launch vehicle, illustrated in FIGS. 6 and 14, has a sabot that encloses the aeroshell and gives it an effectively larger base area. The sabot is preferably composed of at least two petals, even more preferably of two to six petals, and most preferably of four petals. The petals are made of composite or aluminum and fall off of the aeroshell when the vehicle emerges from the launcher and encounters aerodynamic forces.

The aeroshell preferably has a power law shape of the form $r=AX^P$ where the exponent is 0.75, although other viable shapes such as bi-conic exist. The acceptable range of exponent is, though, between 0.25 and 1.5, inclusive. The length to diameter ratio (L/D) is between 3 and 20, exclusive of the endpoints. An L/D of 5 has about 4 times the drag of an L/D of 10. The reason for excluding L/Ds greater than or equal to 20 is the fragility of long skinny objects at extreme speeds in air. Conversely, an L/D of 1 will be rugged but have unacceptably high drag.

The aeroshell covers the housing of the vehicle without, of course, blocking the rocket motor nozzle, and is composed of carbon-phenolic or similar material and has a wall thickness appropriate to the in-bore stresses it will experience. (Carbon-phenolic is a name known by one of ordinary skill in the field of thermal protection for aircraft and reentry bodies.) In-bore stresses are a result of base pressure, velocity, barrel straightness, and vehicle/sabot material. Those of ordinary skill in the art who design vehicles, e.g., designers for the light gas gun at Arnold Engineering and Development Center in Tennessee, use computer Finite Element Analysis (FEA) predictions to design hypersonic gun-launched vehicles based on those parameters. In addition to using computer programs to determine wall thickness, it is desirable to take data from a large number of test launches to validate and augment the FEA results.

The fore-body is preferably capped with an ablative aerospike as illustrated in FIG. 15, although other nose-protection schemes do not use an aerospike but accept a certain level, such as 5 to 10 inches, of nose ablation. And optionally the nose is cooled by transpiration, wherein a fluid such as water is forced through holes in the nose of the aeroshell, as well as other areas where greater thermal protection is desirable. The aerospike is made of a rugged high Q* material like carbon-carbon. It is approximately 1 inch in diameter and 10 inches long. (Aerospike length varies depending on vehicle size and velocity. For the figures given here the inventors have assumed a 1 m diameter aeroshell and a velocity of 6 km s$^{-1}$).

Q* refers to the heat of ablation of a material under extremely high heating rates consistent with orbital speeds. Carbon-carbon is known to those of ordinary skill in the field of thermal protection for re-entry vehicles. Other materials such as Teflon and oak are among acceptable ablative thermal protection system materials. Carbon-carbon has a Q* in excess of 5,000 Btu lb$^{-1}$ or 12 MJ kg$^{-1}$. Phenolic Impregnated Carbon Ablator (PICA) and PICA-X are recent acceptable coatings used by NASA and SpaceX.

Aerospike dimensions can be computed by the use of ablation codes such as Coyote and ABRES (ASCC86) at Sandia National Laboratory (SNL). SNL's Aeroscience and Compressible Fluid Mechanics Department has run aerothermal shape change codes for the inventors in the past to predict the changing shape of a vehicle nose during high speed atmospheric egress. Aeroshell design is a straightforward yet challenging piece of engineering. There are probably several hundred individuals of ordinary skill in the field at SNL, LLNL, Los Alamos National Laboratory, NASA, and assorted companies like SpaceX, Boeing and Lockheed capable of performing the work. There will be some testing required in addition to the simulations.

The aft section of the vehicle preferably has a flared base in order to move the center of pressure rearward, further behind the center of mass, to increase stability. An ACS nozzle, shown in FIGS. 15, 17 and 18, is preferably near the base in order to provide stability and orientation during atmospheric transit. In addition, subtly canted fins (preferably less than five degrees with reference to the longitudinal axis of the vehicle because of the extreme speeds, heating rates, and dynamic pressures experienced by the vehicle in the atmosphere) are optionally present near the base to induce spin.

An aeroshell ejection charge, illustrated in FIG. 16, is located near the nose of the vehicle. Timing of the ejection can be determined from an on-board accelerometer that indicates when the vehicle has obtained approximately 60 to 100 km altitude or more. The actuator at the nose pushes the motor and payload out of the hot aeroshell. There will be other actuators, including exploding bolts and cutting charges, required to sever internal structures to free the motor and payload from the aeroshell. These other actuators will be fired prior to the actuator on the nose that ejects the motor and payload.

When the vehicle is powered by a solid propellant, a cargo compartment will exist. This is also an option when the vehicle uses liquid or hybrid propellant, e.g. when the payload is a satellite.

More commonly, however, if liquid propellant powers the vehicle, and liquid propellant is the cargo, the vehicle contains an oxidizer tank and a fuel tank, as illustrated in FIG. 16, with at least one tank being oversized to carry additional oxidizer or fuel as cargo. Instead of, or in addition to, an oversized tank, a third tank optionally exists in order to carry liquid cargo other than an oxidizer or fuel, such as water or xenon.

A standard liquid propellant is most preferred, a hybrid fuel is preferred, and solid fuel is third in terms of priority of propellants, although priorities may change depending on the specific application. Hybrid rockets use a fuel such as acrylic, polyethylene or polybutadiene and then flow a gaseous oxidizer like oxygen or nitrous oxide over the fuel surface. They are safer than ordinary solid propellant motors yet still throttleable via the oxidizer. Of course when liquid propellant is utilized, there must be one or more valves to control the fuel and oxidizer, and in a hybrid rocket there must be a valve to control the oxidizer.

Primary propulsion of the vehicle is possible with a standard nozzle or multiple standard nozzles. Preferably though, in the case of a liquid propulsion system, a rocket plug nozzle is utilized, as described below and as illustrated in FIGS. 17 and 18.

For the case of liquid propellants for either the primary motor or the attitude control system motor, a manifold and igniter exist unless the propellant is hypergolic, in which case an igniter is unnecessary. In the case of the rocket plug nozzle, the manifold is located near the plug nozzle and regulates and distributes the propellant which is pressurized preferably from centripetal force created by spinning the vehicle.

The ACS nozzle of FIGS. 15, 17, and 18 penetrates the aeroshell. After the aeroshell is discarded along with the exterior ACS nozzle, the interior ACS nozzle is exposed for maneuvers in the vacuum of space.

The ACS system may employ mono or bi-propellant. FIG. 18 shows an annular ACS monopropellant tank located inward of a plug nozzle. FIG. 18 is a cutaway. As best seen in FIG. 17, the plug nozzle and the ACS tank are distributed over the full circumference. Preferably, the plug nozzle is directed inward, preferably substantially 20 degrees inward, and the inner part of the nozzle extends below the ACS tank.

The ACS is controlled by a microprocessor, sensors, and other avionics (not shown since these are standard commercial elements). The avionics package includes an accelerometer, a GPS, a radio transmitter and receiver, a horizon sensor, and a payload integrity sensor. One of ordinary skill in the art would understand control of the ACS, including employees of Ball Aerospace, Boeing, and Lockheed who regularly maneuver spacecraft. The guidance system preferably uses a combination of GPS and inertial guidance, plus active radio telemetry with the depot in the case of staging materials in LEO. This is discussed further in U.S. Pat. No. 8,536,502 B2 and U.S. Pat. No. 8,664,576 B2. Russia's Progress resupply vehicle use an autonomous docking system composed of the TsVM-101 digital flight computer plus the MBITS digital telemetry system. In 2007 the Defense Advanced Research Projects Agency (DARPA) also demonstrated autonomous docking with Orbital Express. DARPA used the Advanced Video Guidance System to control the docking.

The operation of the Gas Gun Launcher is as follows:

For the ocean-based variant, first the OBL is towed or propelled, as shown in FIG. 5, to a preferred ocean location. The buoyancy compensators and thrusters in FIGS. 3 and 4 are used to align the launcher to the correct launch angle and azimuth. An equatorial launch location is often preferred to obtain maximum payload fraction and flexibility in orbital inclination. The down range is scanned with radar and visually to insure range safety.

Next the pump and launch tubes are cleaned, and, if honing (described more fully below) is to be utilized to cause the vehicle to spin, the launch tube is honed. The spin direction during honing can determine the amount and direction of spin imparted to the projectile in-bore. Then the launch tube is automatically aligned using feedback from sensors and subsequently applying tension (utilizing the tensioning cables as described above) in the case of the OBL. (The LBL is aligned instead using threaded actuators on mounting piers.) Next the launch vehicle is loaded with propellant and payload and inserted down the launch tube from the muzzle until it seats near the pump tube (and the sliding seal) as in FIG. 6. If the propellant is cryogenic, then propellant may be vented and topped off as needed by thin tubing penetrations that reach the vehicle from outside the launch tube.

From this point on the system is operated remotely.

The fast-opening valve in the pump tube is closed while the fast-closing valve in the muffler is opened. A diaphragm, preferably composed of Mylar, is fastened across the muzzle prior to pulling a vacuum in the launch tube. A vacuum of a few Torr is pulled separately in both the launch tube and pump tube to remove heavy gas (e.g. air) that would degrade performance and constitute a parasitic launch mass. Care must be taken to maintain lower pressure behind the projectile so that it does not get pushed toward the muzzle.

The pump tube's annular chamber or reservoir is then charged with cold, pressurized light gas through utility lines. The light gas, preferably hydrogen, or a mixture of light gases is fed into the pump tube as shown in FIG. 4 until it reaches about 3,000 psi at ambient temperature. High temperature fluid from the heat source, fueled through utility lines, is introduced into the heat exchanger's duct, raising the light gas reservoir temperature and pressure. After some time the heat exchanger has heated the hydrogen in the pump tube to approximately 1,700 Kelvin and 15,000 psi.

Upon reaching launch condition temperature and pressure, the tracking radars are notified and the fast-opening valve is opened allowing the light gas working fluid to enter the launch tube behind the launch vehicle in a controlled manner, smoothly accelerating the vehicle along the launch tube.

As the vehicle is accelerated down the launch tube to high speed, it pushes a small amount of shocked air in front. The shocked air impacts the Mylar diaphragm and blows it outward allowing the vehicle to exit the muffler untouched. The hydrogen behind the vehicle stagnates against large areas of a fast-closing valve and drives the valve shut, effectively sealing off the launcher with the hydrogen inside. The hydrogen in the launcher takes several minutes to cool down and it is then pumped out, scrubbed and recycled into the hydrogen vessels on the MP shown in FIG. 3.

The fast-closing valve preferably comprises a partition sealingly connected to the inner surface of the muffler, containing an aperture adequate for the passage of the vehicle, and having a door for sealingly closing the aperture rotatably connected to the aperture on the side toward the pump tube. Alternatively, a ball with a diameter larger than the inner diameter of the muffler aperture is placed on the bottom of the muffler, leaving adequate room for passage of the vehicle. The gas behind the vehicle then forces the door closed or pushes the ball into the open end of the muffler.

The hydrogen is expected to thermalize with the tube within 5-15 minutes. The pressure and temperature are anticipated to drop as follows:

|  | t = 0 | t = 1 sec | t = 10 minutes |
| --- | --- | --- | --- |
| Volume (m³) | 1,260 | 6,170 | 6,170 |
| Pressure (psi) | 15,000 | 1,620 | 720 |
| Temp (K) | 1,700 | 900 | 400 |

After approximately 10 minutes the hydrogen is pumped through a conventional industrial type scrubber and back into the storage tanks where it preferably resides near 2,650 psi and ambient temperature. While refilling the storage tanks the hydrogen temperature will increase adiabatically unless the tanks are cooled. The inventors expect this cooling can be accomplished, in the case of the OBL, with the surrounding seawater. The preceding is a standard industrial process, and there are many companies of ordinary skill in the art that can design and build the hydrogen scrubbing and recycling system.

The vehicle emerges from the muffler and the sabot petals are separated from the aeroshell by aerodynamic forces. The petals burn while airborne because of air friction at the high speed of the launch, and due to their low ballistic coefficient land within a few kilometers of the muffler. The vehicle may be spinning on exiting the launch tube or may spin up in the atmosphere due to subtly canted fins. For a spinning vehicle, orientation changes are made if needed by driving gyroscopic precession. Assuming force is applied at right angles to the spin axis, the angular precession rate is given by:

$$\Omega = \tau/L \qquad \text{Eqn. 2}$$

where $\tau$ is torque and $L$ is angular momentum. (See "The Feynman Lectures on Physics" Vol. 1 Chapter 20, p. 6, Eqn. 20.15.)

The preferred ACS has a major novel feature in that it achieves vehicle orientation by stroboscopically applying thrust at right angles to the spin axis of the vehicle in accordance with Equation 2 above. This is important and different. Alternatively, conventional ACS thrust maneuvers do not require a spinning vehicle, but they do require more thrusters (typically two thrusters for pitch and two for yaw located near the nose (or tail), as well as at least two for roll located near the center of mass).

Spinning the vehicle can be performed several ways. Fins can be employed, which will be very small canted protuberances on the aft section. They will not stick out more than about 5% of the vehicle diameter, and will have a cant angle of one to five degrees with respect to the vehicle centerline. Their length can be 5-100% of the vehicle diameter. Optionally, grooves similarly oriented on the surface of the vehicle aeroshell can be employed. Another option is to hone the barrel preferentially in one direction. And alternatively, the inventors believe a practical technique is "prespinning" the vehicle in the launcher prior to launch by spinning the section of launch tube containing the vehicle. Of the three techniques, "prespinning" the vehicle is likely the most precise. The fin option, however, has a side benefit in that it will stabilize the projectile both gyroscopically as well as by moving the center of pressure further aft of the center of mass. All of these methods can be accomplished by one skilled in the art, although significant engineering and testing will be required.

Equation 2 is more transparent here:

$$d\Theta = (F \cdot l_{cm}/L)dt \qquad \text{Eqn. 3}$$

where thrust $F$ is applied at right angles at distance $l_{cm}$ from the center of mass for time $dt$ to cause a precession of $d\Theta$. Sensors determine the orientation of the vehicle with respect to the horizon so that the microprocessor can issue commands to the controller to pulse the nozzle at the appropriate time. Multiple pulses incrementally achieve the desired orientation. Obviously there are other sensors on-board to determine where the vehicle is relative to any depot or object of rendezvous, as well as relative velocity.

As the vehicle ascends through the atmosphere, the aerospike sees maximum heating and will ablate substantially. The rest of the aeroshell should remain largely undisturbed although the minimal fins may also get ablated somewhat. After attaining approximately 60 to 100 km altitude the aeroshell will be ejected exposing the rocket motor and payload. Shortly thereafter, the rocket motor is ignited and burns for approximately 100 seconds as the vehicle nears the desired orbit or orbital depot. The spinning rocket causes significant centripetal propellant pressure thereby, in the preferred embodiment, circumventing the need for a tank pressurization device or a turbo-pump. The ACS is in communication with any depot or object of rendezvous and continues to guide the spinning rocket/payload assembly as they approach.

In the case of orbital staging of materials, upon arriving near the depot a robotic tug fields the rocket/payload assembly. It determines payload integrity and then delivers the assembly to the depot where materials, e.g. propellant, are off-loaded. Alternatively, the assembly may dock directly with the depot.

Alternatives or options in addition to those discussed above are as follows:

The hydrogen may be heated externally to the pump tube with a self-contained heat exchanger using natural gas or another hydrocarbon and air.

A mixture of gases, for example hydrogen, helium and oxygen, may be heated and their hot reaction products used to propel the vehicle through the launcher.

An all steel, non-buoyant launcher may be used even for the OBL. Of course, the cable supports/buoyancy compensators and the recoil fins/buoyancy compensators can be enhanced to make this feasible.

Composites may include fiberglass, Spectra, Kevlar and other high strength fibers.

The OBL may be towed and serviced by a ship instead of using the Maintenance Platform, or it may be self-propelled.

The recoil fins in the breech area may be replaced with conventional shock absorbers.

The launcher may employ a rotating section of the launch tube to impart spin to the vehicle prior to launch. This may be needed to spin up the fluids in a vehicle with liquid propulsion since they will not spin up as rapidly as a solid propellant vehicle.

The LBL can be based in a tunnel.

The launch tube and pump tube can be placed on support members.

The foregoing is not all-inclusive and other alternatives, options, and variations will be obvious to those of ordinary skill.

As used herein, the term "substantially" indicates that one skilled in the art would consider the value modified by such terms to be within acceptable limits for the stated value. Also as used herein the term "preferable" or "preferably" means that a specified element or technique is more acceptable than another but not that such specified element or technique is a necessity.

INDUSTRIAL APPLICABILITY

The way in which the Gas Gun Launcher is capable of exploitation in industry and the way in which the Gas Gun Launcher can be made and used are obvious from the description herein.

What is claimed is:

1. A gas gun launcher for launching a vehicle into space, which comprises:
    a launch tube having a first end and a second end;
    a pump tube defining a chamber, wherein the chamber has a size sufficient to contain a total volume of heated light gas used to launch the vehicle from the gas gun launcher;
    a high-speed opening valve at the first end of said launch tube and in fluid communication with a heat exchanger to receive heated light gas from the heat exchanger;
    a closure at the second end of the launch tube, the closure including a fast-closing valve configured so that the light gas drives the fast-closing valve to a shut position at launch; and
    a light gas recycling system for recycling the light gas from the launch tube.

2. A gas gun launcher according to claim 1 wherein the fast-closing valve comprises a door for sealingly closing the gas gun launcher, and wherein the door is rotatably connected so that the door is closed by the light gas behind the vehicle during launch.

3. A gas gun launcher according to claim 1 wherein the fast-closing valve comprises a ball with a diameter larger than an inner diameter of the valve and positioned so that the light gas behind the vehicle pushes the ball to sealingly close the inner diameter during launch.

4. A gas gun launcher according to claim 1, wherein the launch tube is mounted statically to ground.

5. A gas gun launcher according to claim 1 wherein the pump tube is movable and has a sliding seal between the pump tube and the launch tube.

6. A gas gun launcher according to claim 5 wherein the pump tube is attached to a shock absorber.

7. A gas gun launcher according to claim 1, wherein the high-speed opening valve is configured to control admission of the light gas to the first end of the launch tube as the valve opens so that the light gas is initially below a peak pressure at the vehicle as the vehicle moves from the first end of the launch tube and toward the second end of the launch tube, said valve sealing against a seat.

8. A gas gun launcher according to claim 7 wherein the high-speed opening valve has a brake configured to provide a retaining force against the high-speed opening valve to hold the high-speed opening valve closed against pressure applied to the high-speed opening valve by the light gas.

9. A gas gun launcher according to claim 7 wherein the high-speed opening valve has a shape and a mass such that the light gas is initially below said peak pressure at the vehicle as the vehicle moves from the first end of the launch tube and toward the second end of the launch tube.

10. A gas gun launcher according to claim 9 wherein said high-speed opening valve's shape and mass are such that the light gas is at a peak pressure at the vehicle once said vehicle reaches a distance beyond about a third of a length of the launch tube during launch.

11. A gas gun launcher according to claim 1 wherein the light gas consists essentially of hydrogen.

12. A gas gun launcher according to claim 1 and further comprising an automatic launch tube alignment system configured to straighten the launch tube.

13. A gas gun launcher for launching a vehicle into space, which comprises:
    a launch tube having a first end and a second end;
    a movable pump tube defining a chamber, wherein the chamber has a size sufficient to contain a total volume of heated light gas used to launch the vehicle from the gas gun launcher, the movable pump tube being movable relative to the launch tube;
    a high-speed opening valve at the first end of said launch tube and in fluid communication with a heat exchanger to receive heated light gas from a heat exchanger; and
    a recoil absorber for at least one end of the launch tube.

14. A gas gun launcher according to claim 13 wherein the recoil absorber enables relative movement of the movable pump tube at the first end of the launch tube.

15. A gas gun launcher according to claim 14 wherein the movable pump tube is connected to the first end of the launch tube by a slidable seal.

16. A gas gun launcher according to claim 14 wherein the recoil absorber further comprises a movable muffler at the second end of the launch tube.

17. A gas gun launcher according to claim 13 wherein the recoil absorber comprises a movable muffler at the second end of the launch tube.

18. A gas gun launcher according to claim 17 wherein the movable muffler is connected to the second end of the launch tube by a slidable seal.

* * * * *